US008688959B2

(12) United States Patent
Macy, Jr. et al.

(10) Patent No.: US 8,688,959 B2
(45) Date of Patent: Apr. 1, 2014

(54) METHOD AND APPARATUS FOR SHUFFLING DATA

(75) Inventors: William W. Macy, Jr., Palo Alto, CA (US); Eric L. Debes, Santa Clara, CA (US); Patrice L. Roussel, Portland, OR (US); Huy V. Nguyen, Pflugerville, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/608,953

(22) Filed: Sep. 10, 2012

(65) Prior Publication Data

US 2013/0007416 A1 Jan. 3, 2013

Related U.S. Application Data

(60) Continuation of application No. 13/540,576, filed on Jul. 2, 2012, which is a continuation of application No. 12/901,336, filed on Oct. 8, 2010, now Pat. No. 8,225,075, which is a continuation of application No. 12/387,958, filed on Mar. 31, 2009, now Pat. No. 8,214,626, which is a division of application No. 10/611,344, filed on Jun. 30, 2003, now abandoned, which is a continuation-in-part of application No. 09/952,891, filed on Oct. 29, 2001, now Pat. No. 7,085,795.

(51) Int. Cl.
*G06F 7/00* (2006.01)

(52) U.S. Cl.
USPC .......................................................... 712/22

(58) Field of Classification Search
None
See application file for complete search history.

(56) References Cited

U.S. PATENT DOCUMENTS

| | | |
|---|---|---|
| 3,711,692 A | 1/1973 | Batcher |
| 3,723,715 A | 3/1973 | Chen et al. |
| 4,139,899 A | 2/1979 | Tulpule et al. |
| 4,161,784 A | 7/1979 | Cushing et al. |
| 4,393,468 A | 7/1983 | New |
| 4,418,383 A | 11/1983 | Doyle et al. |
| 4,490,786 A | 12/1984 | Nakatani |

(Continued)

FOREIGN PATENT DOCUMENTS

| | | |
|---|---|---|
| EP | 0130380 | 5/1984 |
| EP | 0363176 | 10/1989 |

(Continued)

OTHER PUBLICATIONS

U.S. Appl. No. 10/612,061 Non-Final Office Action, mailed Aug. 16, 2006, pp. 1-8.

(Continued)

*Primary Examiner* — Andrew Caldwell
*Assistant Examiner* — Benjamin Geib
(74) *Attorney, Agent, or Firm* — Blakely, Sokoloff, Taylor & Zafman LLP

(57) ABSTRACT

Method, apparatus, and program means for shuffling data. The method of one embodiment comprises receiving a first operand having a set of L data elements and a second operand having a set of L control elements. For each control element, data from a first operand data element designated by the individual control element is shuffled to an associated resultant data element position if its flush to zero field is not set and a zero is placed into the associated resultant data element position if its flush to zero field is not set.

10 Claims, 30 Drawing Sheets

(56) References Cited

U.S. PATENT DOCUMENTS

| | | | |
|---|---|---|---|
| 4,498,177 A | 2/1985 | Larson | |
| 4,707,800 A | 11/1987 | Montrone et al. | |
| 4,771,379 A | 9/1988 | Ando et al. | |
| 4,903,228 A | 2/1990 | Gregoire et al. | |
| 4,989,168 A | 1/1991 | Kuroda et al. | |
| 5,019,968 A | 5/1991 | Wang et al. | |
| 5,081,698 A | 1/1992 | Kohn | |
| 5,095,457 A | 3/1992 | Jeong | |
| 5,168,571 A | 12/1992 | Hoover et al. | |
| 5,187,679 A | 2/1993 | Vassiliadis et al. | |
| 5,268,995 A | 12/1993 | Diefendorff et al. | |
| 5,321,810 A | 6/1994 | Case et al. | |
| 5,390,135 A | 2/1995 | Lee et al. | |
| 5,408,670 A | 4/1995 | Davies | |
| 5,410,661 A | 4/1995 | Tamura | |
| 5,423,010 A | 6/1995 | Mizukami | |
| 5,426,783 A | 6/1995 | Norrie et al. | |
| 5,465,374 A | 11/1995 | Dinkjian et al. | |
| 5,487,159 A | 1/1996 | Byers et al. | |
| 5,497,497 A | 3/1996 | Miller et al. | |
| 5,524,256 A | 6/1996 | Turkowski | |
| 5,579,253 A | 11/1996 | Lee et al. | |
| 5,594,437 A | 1/1997 | O'Malley | |
| 5,625,374 A | 4/1997 | Turkowski | |
| 5,636,352 A | 6/1997 | Bealkowski et al. | |
| 5,680,161 A | 10/1997 | Lehman et al. | |
| 5,781,457 A | 7/1998 | Cohen et al. | |
| 5,784,709 A | 7/1998 | McLellan et al. | |
| 5,805,915 A | 9/1998 | Wilkinson et al. | |
| 5,819,101 A | 10/1998 | Peleg et al. | |
| 5,819,117 A | 10/1998 | Hansen | |
| 5,822,619 A | 10/1998 | Sidwell | |
| 5,838,984 A | 11/1998 | Nguyen et al. | |
| 5,909,572 A | 6/1999 | Thayer et al. | |
| 5,933,650 A | 8/1999 | van Hook et al. | |
| 6,041,404 A | 3/2000 | Roussel et al. | |
| 6,088,795 A | 7/2000 | Vorbach et al. | |
| 6,098,087 A | 8/2000 | Lemay | |
| 6,115,812 A | 9/2000 | Abdallah et al. | |
| 6,192,467 B1 | 2/2001 | Abdallah et al. | |
| 6,211,892 B1 | 4/2001 | Huff et al. | |
| 6,223,277 B1 | 4/2001 | Karguth | |
| 6,275,834 B1 | 8/2001 | Lin et al. | |
| 6,288,723 B1 | 9/2001 | Huff et al. | |
| 6,307,553 B1* | 10/2001 | Abdallah | 345/419 |
| 6,381,690 B1 | 4/2002 | Lee | |
| 6,446,198 B1* | 9/2002 | Sazegari | 712/300 |
| 6,484,255 B1 | 11/2002 | Dulong | |
| 6,546,480 B1 | 4/2003 | Mandavilli et al. | |
| 6,745,319 B1 | 6/2004 | Balmer et al. | |
| 6,816,961 B2* | 11/2004 | Rice et al. | 712/223 |
| 7,085,795 B2 | 8/2006 | Debes et al. | |
| 7,155,601 B2 | 12/2006 | Chennupaty et al. | |
| 7,631,025 B2 | 12/2009 | Debes et al. | |
| 7,739,319 B2 | 6/2010 | Macy, Jr. et al. | |
| 2001/0016902 A1 | 8/2001 | Abdallah et al. | |
| 2002/0002666 A1* | 1/2002 | Dulong et al. | 712/224 |
| 2002/0035678 A1 | 3/2002 | Rice et al. | |
| 2002/0112147 A1 | 8/2002 | Chennupaty et al. | |
| 2002/0159529 A1 | 10/2002 | Wang et al. | |
| 2002/0172287 A1 | 11/2002 | Kim | |
| 2003/0046559 A1 | 3/2003 | Macy et al. | |
| 2003/0084082 A1 | 5/2003 | Debes et al. | |
| 2003/0123748 A1 | 7/2003 | Sebot et al. | |
| 2003/0131030 A1 | 7/2003 | Sebot et al. | |
| 2003/0231711 A1 | 12/2003 | Zhang et al. | |
| 2004/0054877 A1 | 3/2004 | Macy et al. | |
| 2004/0054878 A1 | 3/2004 | Debes et al. | |
| 2005/0188182 A1* | 8/2005 | Hoyle et al. | 712/224 |
| 2009/0265523 A1 | 10/2009 | Macy, Jr. et al. | |

FOREIGN PATENT DOCUMENTS

| | | |
|---|---|---|
| JP | 07-021034 | 1/1995 |
| JP | 2000057111 | 2/2000 |
| RU | 2138845 | 9/1999 |
| RU | 2157562 | 10/2000 |
| WO | WO-9708608 | 3/1997 |
| WO | WO03/038601 A1 | 5/2003 |
| WO | WO-2005006183 | 1/2005 |

OTHER PUBLICATIONS

U.S. Appl. No. 10/612,061 Final Office Action, mailed Mar. 13, 2007, pp. 1-6.

U.S. Appl. No. 10/612,061 Final Office Action, mailed Sep. 26, 2007, pp. 1-6.

U.S. Appl. No. 10/612,061 Final Office Action, mailed Nov. 23, 2007, pp. 1-6.

U.S. Appl. No. 10/612,061 Final Office Action, mailed Feb. 8, 2008, pp. 1-9.

U.S. Appl. No. 10/612,061 Final Office Action, mailed Oct. 8, 2008, pp. 1-5.

U.S. Appl. No. 10/612,061 Notice of Allowance and Fees mailed Mar. 16, 2009, 4 pages.

U.S. Appl. No. 10/612,061 Notice of Allowance and Fees mailed Jul. 9, 2009, 4 pages.

U.S. Appl. 10/611,344, 109 pages.

U.S. Appl. No. 10/611,344 Non-Final Office Action, mailed Dec. 29, 2005, pp. 1-22.

U.S. Appl. No. 10/611,344 Final Office Action, mailed Sep. 20, 2006, pp. 1-27.

U.S. Appl. No. 10/611,344 Advisory Action, mailed Dec. 19, 2006, pp. 1-3.

U.S. Appl. No. 10/611,344 Non-Final Office Action, mailed Apr. 4, 2007, pp. 1-22.

U.S. Appl. No. 10/611,344 Final Office Action, mailed Dec. 27, 2007, pp. 1-17.

U.S. Appl. No. 10/611,344 Advisory Action, mailed Mar. 18, 2008, pp. 1-3.

U.S. Appl. No. 10/611,344 Notice of Abandonment, mailed Jul. 18, 2008, pp. 1-2.

Petition Decision dated May 12, 2009 for U.S. Appl. No. 10/611,344, 1 page.

Taiwan Patent Application No. 93118830 Non-Final Office Action mailed May 17, 2006, 5 pages.

China Patent Application No. 200480018443.8 Non-Final Office Action mailed Mar. 16, 2007, 17 pages.

China Patent Application No. 200480018443.8 Non-Final Office Action mailed Aug. 8, 2008, 10 pages.

European Patent Application No. 04756204.6 Non-Final Office Action mailed Jul. 18, 2007, 4 pages.

Japan Patent Application No. 2006-515370 Non-Final Office Action mailed Sep. 30, 2008, 9 Pages.

Japan Patent Application No. 2006-515370 Non-Final Office Action mailed Nov. 4, 2009, 6 pages.

Japan Patent Application No. 2006-515370 Final Office Action mailed May 11, 2010, 3 Pages.

Korean Patent Application No. 10-2005-7025313 Non-Final Office Action mailed Dec. 15, 2006, 1 Page.

U.S. Appl. No. 10/612,592 108 pages.

U.S. Appl. No. 10/612,592 Non-Final Office Action dated Aug. 17, 2006, 5 pages.

U.S. Appl. No. 10/612,592 Notice of Allowance mailed Jan. 25, 2010, 4 pages.

U.S. Appl. No. 10/612,592 Final Office Action dated Mar. 26, 2007, 5 pages.

International Search Report and WO for European Patent Application No. PCT/US204/020601 mailed Sep. 22, 2005, 11 Pages.

International Preliminary Report on Patentability and Written Opinion for European Patent Application No. PCT/US2004/020601 mailed Jan. 12, 2006, 7 Pages.

Abbott, Curtis et al., "Broadband Algorithms with the MicroUnity Mediaprocessor", Proceedings of COMPCON '96, (1996), 6 Pages.

(56) References Cited

OTHER PUBLICATIONS

Advanced Micro Devices, Inc., "AMD-3D Technology Manual", Feb. 1998, pp. 1-68.

Avaro, Olivier et al. "MPEG-4 Systems Overview and Architecture," woody.imag.fr/MPEG4/syssite/syspub/docs/tutorial/, May 28, 1998, plus Yahoo site ref., pp. 1-71.

Bierling, M., "Displacement Estimation by Hierarchical Blockmatching", SPIE, vol. 1001, Visual Communications and Image Processing, May 1998, pp. 942-951.

Case, B, "Phillips Hopes to Displace DSPs with VLIW, TriMedia Processors Aimed at Future Multimedia Embedded Apps", Microprocessor Report, Dec. 1994, pp. 12-18.

Chan, Y. L. et al., "Adaptive Multiple-Candidate Hierarchical Search for Block Matching Algorithm", IEE Electronics Letters vol. 31 No. 19, Sep. 14, 1995, pp. 1637-1639.

Chan, Yui-Lam et al., "New Adaptive Pixel Decimation for Block Motion Vector Estimation", IEEE Transactions on Circuits and Systems on Video Technology, vol. 6, No. 1, Feb. 1996, pp. 113-118.

Chen, Liang-Gee et al., "An Efficient Parallel Motion Estimation Algorithm for Digital Image Processing", IEEE Transactions on Circuits and Systems on Video Technology, vol. 1, No. 4, Dec. 1991, pp. 378-384.

Cheng, K. W. et al., "Fast Block Matching Algorithms for Motion Estimation", 0-7803-3192-3/96 IEEE, ICASSP96, May 1996, pp. 2311-2314.

Corbal, Jesus et al., "DLP + TLP Processors for the Next Generation of Media Workloads", 0/7695-1019-1/01 IEEE, 2001, pp. 219-228.

Day, Neil et al., "Introduction to MPEG-7 (v3.0)," International Organisation for Standardisation Organisation Internationale de Normalisation ISO/IEC JTC1/SC29/WG11 Coding of Moving Pictures and Video, N4032, Mar. 2001, Singapore, pp. 1-10.

Diefendorff, Keith et al., "AltiVec Extension to PowerPC Accelerates Media Processing," IEEE, #0272-1732/00, 2000, pp. 85-95.

Dufaux, Frederic et al., "Efficient, Robust, and Fast Global Motion Estimation for Video Coding", IEEE Transactions on Image Processing, vol. 9, No. 3, 1057-7149/00, Mar. 2000, pp. 497-501.

Eckart, Stefan et al., "ISO/IEC MPEG-2 Software Video Codec", Digital Video Compression: Algorithms and Technologies, SPIE vol. 2419, 1995, San Jose, CA. 12 pgs.

Edirisinghe, E. A. et al., "Shape Adaptive Padding for MPEG-4", IEEE Transactions on Consumer Electronics, vol. 46, No. 3, 0098 3063/00, Aug. 2000 (Original manuscript received Jun. 19, 2000), pp. 514-520.

Feng, J., et al., "Adaptive Block Matching Motion Estimation Algorithm for Video Coding", IEE Electronics Letters, vol. 31, No. 18, 1995, pp. 1542-1543 plus title page.

Furht, Borko et al., "Motion Estimation Algorithms for Video Compression", Florida Atlantic University, Kluwer Academic Publishers, Boston, 1997, pp. cover-vi, 11 and 49-95.

Ghanbari, M., "The Cross-Search Algorithm for Motion Estimation", IEEE Transactions on Communications, vol. 38, No. 7, Jul. 1990, pp. 950-953.

Goodman & Miller, "A Programmer's View of Computer Architecture with Assembly Language Examples from the MIPS RISC Architecture", Copyright 1993, Oxford University Press, ISBN-0-19-513109-6, pp. 199-202.

Gwennap, L, "New PA-RISC Processor Decodes MPEG Video, HP's PA-7100LC Uses New Instructions to Eliminate Decoder Chip.", Microprocessor Report, Jan. 1994, pp. 16-17.

Hansen, Craig, "Architecture of a Broadband Mediaprocessor," Proceeedings of Compcon, IEEE, 1996, 1063-639/96, pp. 334-340.

Hayes, Raymond et al., "MicroUnity Software Development Environment", Proceedings of COMPCON '96, (1996), pp. 341-348.

He, Zhongli et al., "A High Performance Fast Search Algorithm for Block Matching Motion Estimation", IEEE Transactions on Circuits and Systems for Video Technology, vol. 7, No. 5., Oct. 1997, 1051-8215/97, pp. 826-828.

He, Zhongli et al., "Design of Fast Motion Estimation Algorithm Based on Hardware Consideration", IEEE Transactions on Circuits and Systems for Video Technology, vol. 7, No. 5, Oct. 1997, pp. 819-823.

Heising, Guido et al., "MPEG-4 Version 2 Video Reference Software Package", AC098/HHI/WP5.1\DS\P\049\B1, 1998, Abstract and pp. 1-8.

Hewlet, Packard, "64-bit and Multimedia Extensions in the PA-RISC 2.0 Architecture", Microprocessors Precision Architecture, Jul. 17, 1997, 1-18 pgs.

Intel Corporation, "Block-Matching in Motion Estimation Algorithms Using Streaming SIMD Extensions 2 (SSE2)", Version 2.0, Sep. 22, 2000, Order No. 248605-001, pp. 1-13, A-1, A-2.

Intel Corporation, "Intel i750, i860 TM, i960 Processors and Related Products," 1993, pp. 1-3.

Intel Corporation, "i860 TM Microprocessor Family Programmer's Reference Manual," 1992, Chapters 1, 3, 8 and 11, 109 pages. (It's Chapter 12, not 11?).

Intel Corporation, "IA-32 Intel Architecture Software Developer's Manual", vol. 1: Basic Architecture, www.intel.com, order No. 245470, 2003, 426 Pages.

Intel Corporation, "Intel Architecture Software Developer's Manual", vol. 2: Instruction Set Reference, (1999), 854 Pages.

Intel Corporation, "Pentium Processor Family Developer's Manual", www.intel.com, 1997, 609 pages.

Intel Corporation, "Pentium Processor User's Manual", vol. 3: Architecture and Programming Manual, 1993, Chapters 1, 3, 4, 6, 8, and 18, 169 pages.

Intel Corporation, "Willamette Processor Software Developer's Guide", http://developer.intel.com/design/processor/index.htm, Feb. 2000, Order No. 245355-001, 314 Pages.

International Organisation for Standardisation, "New MPEG-4 Profiles Under Consideration", ISO/IEC JTC1/SC29/WG11, #N3932, Coding of Moving Pictures and Audio, Pisa, Jan. 2001, pp. 1-35.

International Organisation for Standardisation, Optimization Model, Version 2.0, ISO/IEC JTC1/SC29/WG11, Coding of Moving Pictures and Audio, #N3675, La Baule, Oct. 2000, 12 pp.

Jain, Jaswant R. et al., "Displacement Measurement and Its Application in Interframe Image Coding", IEEE Transactions on Communications, vol. Com-29, No. 12, Dec. 1981, pp. 1799-1808.

Ju, John C. et al., "A Fast Rate-Optimized Motion Estimation Algorithm for Low-Bit-Rate Video Coding", IEEE Transactions on Circuits and Systems for Video Technology, vol. 9, No. 7, 1051-8215/99, 1999, pp. 994-1002.

Jung, Hae M. et al., "An Annular Search Algorithm for Efficient Motion Estimation", International Picture Coding Symposium, PCS96, Melbourne, Australia, Mar. 13-15, 1996, pp. 171-174.

Kappagantula, S. et al., "Motion Compensated Interframe Image Prediction", 0090-6778/85/0900-1011, IEEE, 33(9), Sep. 1985, pp. 1011-1015.

Kawakami, Y et al., "A Single-Chip Digital Signal Processor for Voiceband Applications", IEEE 1980 International Solid-State Circuits Conference, Feb. 13, 1980, pp. 40-41.

Kim, Joon-Seek et al., "A Fast Feature-Based Block Matching Algorithm Using Integral Projections", IEEE Journal on Selected Areas in Communications, vol. 10, No. 5, Jun. 1992, pp. 968-971.

Kim, Michelle, (Editor), MPEG-4 Systems, International Organization for Standardization, ISO/IEC JTC1/SC29/WG11, Coding of Moving Pictures and Audio, #N3383, Title: "ISO/IEC 14496-1/FPDAM2," ISO/IEC 14496-1:1999/Amd.2.2000(E), Jun. 2000, pp. 1-19.

Kneip, Johannes et al., "Applying and Implementing the MPEG-4 Multimedia Standard", 0272-1732/99, IEEE, 1999, pp. 64-74.

Kneip, J. et al., "The MPEG-4 Video Coding Standard—A VLSI Point of View", IEEE Workshop on Signal Processing Systems (SIPS98), Oct. 8-10, 1998, pp. 43-52, A-1, A-2.

Koenen, Rob "Overview of the MPEG-4 Standard", International Organisation for Standardisation, ISO/IEC JTC1/SC29/WG11, #N4030, Coding of Moving Pictures and Audio, Mar. 2001, pp. 1-69.

Koga, T. et al., "Motion-Compensated Interframe Coding for Video Conferencing", Nippon Electric Co., Ltd., Kawasaki, Japan, CH1679-0/81/0000-0312 IEEE, 1981, pp. G5.3.1-G5.3.4.

(56) References Cited

OTHER PUBLICATIONS

Kuhn, Peter, "Algorithms, Complexity Analysis and VLSI Architectures for MPEG-4 Motion Estimation", 1999 Kluwer Academic Publishers, Boston, pp. cover-vi, 15, 17-59, 107-109, 119-121, 147-167, and 189-204.

Kuhn, Peter M. et al., "Complexity Analysis of the Emerging MPEG-4 Standard as a Basis for VLSI Implementation", SPIE vol. 3309, Visual Communications and Image Processing, San Jose, 0-277-786X/97, Jan. 28-30, 1998, pp. 498-509.

Lee, Xiaobing et al., "A Fast Hierarchical Motion-Compensation Scheme for Video Coding Using Block Feature Matching", IEEE Transactions on Circuits and Systems for Video Technology, vol. 6, No. 6, 1051-8215/96, Dec. 1996, pp. 627-635.

Lee, Ruby B., "Accelerating Multimedia with Enhanced Microprocessors." IEEE Micro, 0272-1732/95, Apr. 1995, pp. 22-32.

Lee, Liang-Wei et al., "Dynamic Search-Window Adjustment and Interlaced Search for Block-Matching Algorithm", IEEE Transactions on Circuits and Systems for Video Technology, vol. 3, No. 1, Feb. 1993, pp. 85-87.

Lee, Woobin et al., "MediaStation 5000: Integrating Video and Audio", 1070-986X/94, IEEE Multimedia, vol. 1, No. 4, 1994, pp. 50-61.

Lengwehasatit, Krisda et al., "A Novel Computationally Scalable Algorithm for Motion Estimation", SPIE Vo. 3309, 0277-786X/97, Jan. 28-30, 1998, San Jose, CA, pp. 66-79.

Levinthal, et al., "Chap—A SIMD Graphics Processor," Computer Graphics Project, ACM, vol. 18, No. 3, ACM-0-89791-138-5/84/007/0077, Jul. 1984, pp. 77-81.

Levinthal, et al., "Parallel Computers for Graphics Applications," Proceedings: Second International Conference on Architectural Support for Programming Languages and Operating Systems, (ASPLOS II), San Rafael, California, IEEE, 1987, ACM 0-89791-238-1/87/1000-0193, pp. 193-198.

Li, Renxiang et al., "A New Three-Step Search Algorithm for Block Motion Estimation", IEEE Transactions on Circuits and Systems for Video Technology, vol. 4, No. 4, Aug. 1994, 1051-8215/94, pp. 438-442.

Li, W. et al., "Successive Elimination Algorithm for Motion Estimation," IEEE Transactions on Image Processing, vol. 4, No. 1, Jan. 1995, 1057-7149/95, pp. 105-107.

Liang, Jie et al., "Region-Based Video Coding with Embedded Zero-Trees", 1068-0314/97, IEEE, 1997, p. 449.

Liu, Lurng-Kuo et al., "A Block-Based Gradient Descent Search Algorithm for Block Motion Estimation in Video Coding", IEEE Transactions on Circuits and Systems for Video Technology, vol. 6, No. 4, 1051-8215/96, Aug. 1996, pp. 419-422.

Liu, Bede et al., "New Fast Algorithms for the Estimation of Block Motion Vectors", IEEE Transactions on Circuits and Systems for Video Technology, vol. 3, No. 2, Apr. 1993, pp. 148-157.

Margulis, N, "i860 Microprocessor Architecture," McGraw Hill., Inc., 1990, Chapters 6, 7, 8, 10, and 11. (170 pages).

Mips.com, "MIPS Digital Media Extension," Set Architecture Specification, Web Site—mips.com/MDMXspec.ps, Rev. 1.0, Oct. 21, 1997, 40 pages.

Mo, Hyeon-Cheol et al., "A High-Speed Pattern Decoder in MPEG-4 Padding Block Hardware Accelerator", IEEE 0/7803-6685-9/01, 2001, pp. II-197—II-200.

Moschetti, Fulvio et al., "A Fast Block Matching for SIMD Processors Using SubSampling", ISCAS 2000—IEEE International Symposium on Circuits and Systems, Geneva, Switzerland, IEEE #0-7803-5482-6/99, May 28-31, 2000, pp. IV-321—IV-324.

Moschetti, F. et al., "About MacroBlock SubSampling for Motion Estimation on IA-64", 2001 IEEE International Conference on Multimedia Expo, (ICME 2001), Tokyo, Japan, Aug. 2001, 4 pp.

Motorola, Inc, "Errata to MC88110 Second Generation RISC Microprocessor User's Manual," 1992, pp. 1-11.

Motorola, Inc., "MC88110 Programmer's Reference Guide", Rev. 1.0, 1992, pp. 1-4.

Motorola, Inc., "Motorola MC88110 Second Generation RISC Microprocessor User's Manual", 1991, 627 pages.

Nam, Kwon M. et al., "A Fast Hierarchical Motion Vector Estimation Algorithm Using Mean Pyramid", IEEE Transactions on Circuits and Systems for Video Technology, vol. 5, No. 4, Aug. 1995, 1051-8215/95, pp. 344-351.

Netravali, Arun N. et al., "Digital Pictures Representation and Compression", Plennum Press, New York and London, (1988), pp. cover—XV, 334-340, 354-355, 537-542 (18 actual pages).

Philips Electronics, "TriMedia TM1000 Preliminary Data Book," 1997, 496 pgs.

Pirsch, Peter et al., "VLSI Architectures for Video Compression—A Survey", Proceedings of the IEEE, vol. 83, No. 2, Feb. 1995, 0018-9219/95, pp. 220-246.

Po, Lai-Man et al., "A Novel Four-Step Search Algorithm for Fast Block Motion Estimation," IEEE Transactions on Circuits and Systems on Video Technology, vol. 6, No. 3, 1051-82115/96, Jun. 1996, pp. 313-317.

Puri, A. et al., "An Efficient Blockmatching Algorithm for Motion Compensated Coding," Proc. IEEE ICASSP, CH2396-0/87/0000-1063,1987, pp. 25.4.1-25.4.4.

Ragsdale, Gary L. et al., "Relationships of Popular Transmission Characteristics to Perceived Quality for Digital Video Over ATM", National Communications System, Technical Information Bulletin 99-2, Jan. 1999, 64 pp.

Ramkishor, K. et al., "Real Time Implementation of MPEG-4 Video Decoder on ARM7TDMI", Proceedings of 2001 International Symposium on Intelligent Multimedia, Video and Speech Processing, Hong Kong, May 2-4, 2001, pp. 522-526.

Shi, Y. Q. et al., "Thresholding Multiresolution Block Matching Algorithm", IEEE Transactions on Circuits and Systems for Video Technology, vol. 7, No. 2, Apr. 1997, 1051-8215/97, pp. 437-440.

Shipnes, Julie, "Graphics Processing with the 88110 RISC Microprocessor", Motorola, Inc., IEEE, No. 0-8186-2655-0/92, 1992, pp. 169-174.

Sikora, Thomas, "MPEG Digital Video Coding Standards", Preprint from Digital Consumer Electronics Handbook, First Edition, McGraw-Hill Book Company, 1997, Chapter 9, pp. 1-43.

Sikora, Thomas, "MPEG-1 and MPEG-2 Digital Video Coding Standards", Digital Consumer Electronics Handbook, McGraw-Hill Book Company, 1997, pp. 1-43.

Sikora, Thomas, "The Structure of the MPEG-4 Video Coding Algorithm", IEEE Transaction on Circuits and Systems for Video Technology (invited paper), Preprint from Digital Consumer Electronics Handbook, McGraw-Hill Book Company, Jun. 1996, pp. 1-16.

Silicon Graphics, Inc., "Silicon Graphics Introduces Compact MIPS@ RISC Microprocessor Code for High Performance at a Low Cost", www.sgi.com, Oct. 21, 1996, 2 Pages.

Song, Byung C. et al., "A Hierarchical Block Matching Algorithm Using Partial Distortion Criteria", SPIE vol. 3309 VCIP Visual Communications and Image Processing, San Jose, CA, 1998, 0277-786X/97, pp. 88-95.

Srinivasan, Ram et al., "Predictive Coding Based on Efficient Motion Estimation", IEEE Transactions on Communications, vol. COM-33, No. 8, Aug. 1985, pp. 888-896.

Stolberg, H. J. et al., "The M-Pire MPEG-4 Codec DSP and its Macroblock Engine", ISCAS 2000—IEEE International Symposium on Circuits and Systems, Geneva, Switzerland,0-7803-5482-6/99, May 28-31, 2000, pp. II-192-II-195.

Sun, Microsystems I., "UltraSPARC Multimedia Capabilities On-Chip Support for Real-Time Video and Advanced Graphics", SPARC Technology Business, Sep. 1994, 8 pgs.

Sun Microsystems, Inc., "The Visual Instruction Set (VIS™): On Chip Support for New-Media Processing", ULTRASPARC, White Paper 95-022, Jun. 6, 1996, downloaded Jul. 17, 1997, 7 Pages.

Texas Instruments "TMS320C2x User's Guide," 1993, pp. 3:2-3:11; 3:28-3:34; 4:1-4:22; 4:41; 4:103; 4:119-J; 120; 4:122; 4:150-4:151. (47 pages).

Tham, Jo Y. et al., "Transactions Letters: A Novel Unrestricted Center-Biased Diamond Search Algorithm for Block Motion Estimation," IEEE Transactions on Circuits and Systems for Video Technology, vol. 8, No. 4,1051-8215/98, Aug. 1998, pp. 369-377.

Van Der Schaar, Mihaela et al., "Near-Lossless Complexity-Scalable Embedded Compression Algorithm for Cost Reduction in DTV

(56) References Cited

OTHER PUBLICATIONS

Receivers", IEEE Transactions on Consumer Electronics, vol. 46, No. 4, 0098 3063/00, IEEE, Nov. 2000, pp. 923-933.

Wang, et al., "A Processor Architecture for 3D Graphics Calculations," Computer Motion, Inc., Goleta, CA, Sep. 1992, 23 pgs.

Wang, Chung-Neng et al., "Improved MPEG-4 Visual Texture Coding Using Double Transform Coding," 0-7803-6685-9/01, IEEE, 2001, pp. V-227—V-230.

Westerink, P. H. et al., "Two-Pass MPEG02 Variable-Bit-Rate Encoding," IBM J. Res. Develop, vol. 43, No. 4, Jul. 1999, 0018-8646, pp. 471-488.

Wittenburg, J. P. et al., "HiPAR-DSP: A Parallel VLIW RISC Processor for Real Time Image Processing Applications", 0-7803-4229-1/97, IEEE, 1997, pp. 155-162.

Xu, Jie-Bin et al., "A New Prediction Model Search Algorithm for Fast Block Motion Estimation", IEEE Proceedings International Conference on Image Processing, vol. III, Santa Barbara, California, ICIP97, 1997, 0-8186-8183-7/97, pp. 610-613.

Yu, Fengqi et al., "A Flexible Hardware-Oriented Fast Algorithm for Motion Estimation", 1997 IEEE International Conference on Acoustics, Speech, and Signal Processing, vol. IV of V, Multidimensional Signal Processing, Neural Networks, Integrated Circuits and Systems Laboratory, University of California, Los Angeles, ICASSP97, Apr. 21-24, 1997, Munich Germany, 0-8186-7919-0/97, pp. 2681-2683.

Zhu, Shan et al., "A New Diamond Search Algorithm for Fast Block-Matching Motion Estimation," IEEE Transactions on Image Processing, vol. 9, No. 2, Feb. 2000, 1057-7149/00, pp. 287-290.

Japan Patent Application No. 2010-180413, Office Action and English Translation, mailed Dec. 4, 2012, 8 Pages Japan Patent Application No. 2010-180413, Decision of Refusal and English Translation, mailed Sep. 3, 2013, 7 Pages.

Japan Patent Application No. 2011-045001, Office Action and English Translation, mailed May 7, 2013, 12 Pages.

Japan Patent Application No. 2011-045001, Office Action and English Translation, mailed Sep. 3, 2013, 5 pages.

U.S. Appl. No. 13/540,576 Non Final Office Action dated Sep. 11, 2012, 7 pages.

U.S. Appl. No. 13/540,576 Final Office Action dated Jan. 15, 2013, 8 pages.

U.S. Appl. No. 13/540,576 Non Final Office Action dated Aug. 1, 2013, 10 pages.

\* cited by examiner

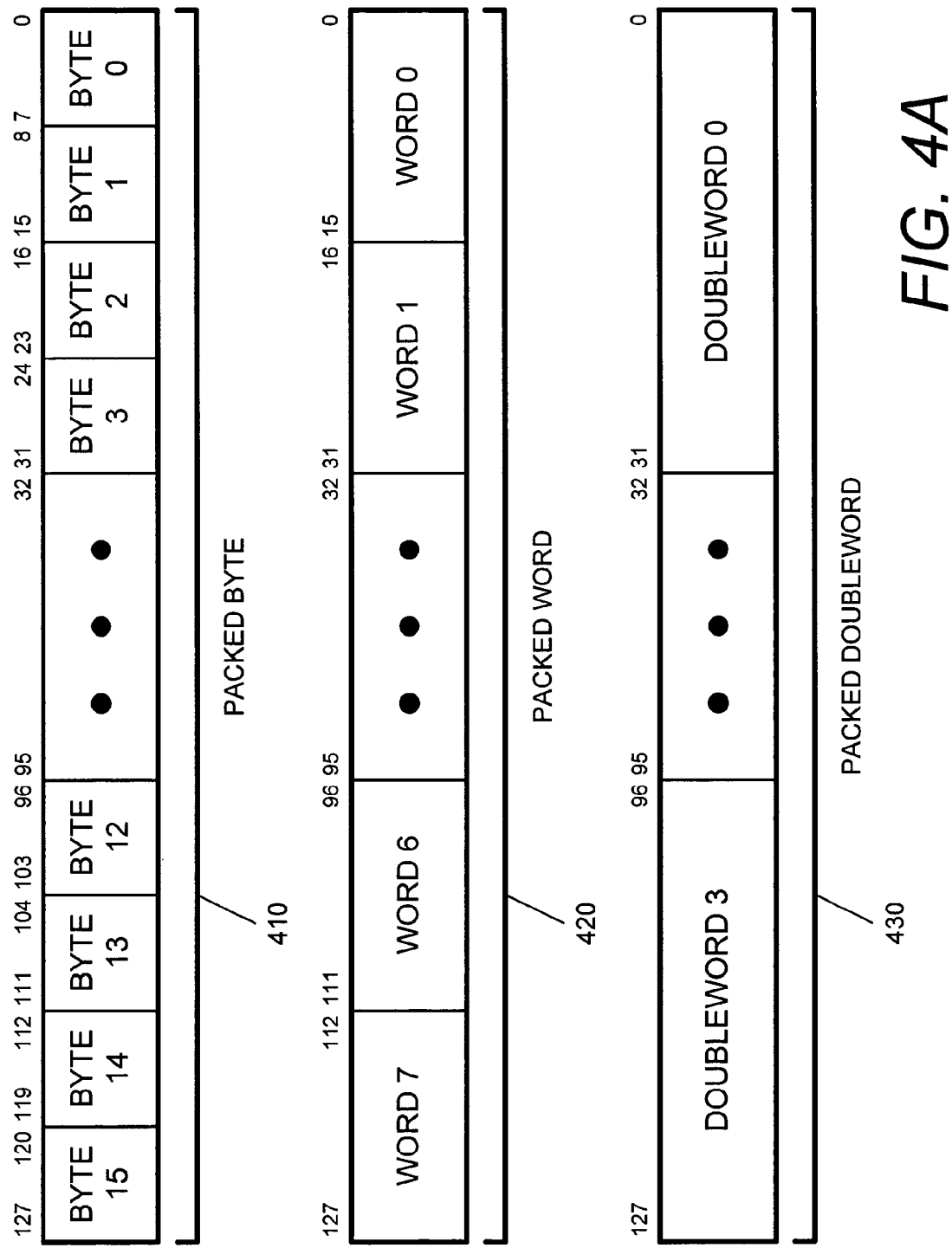

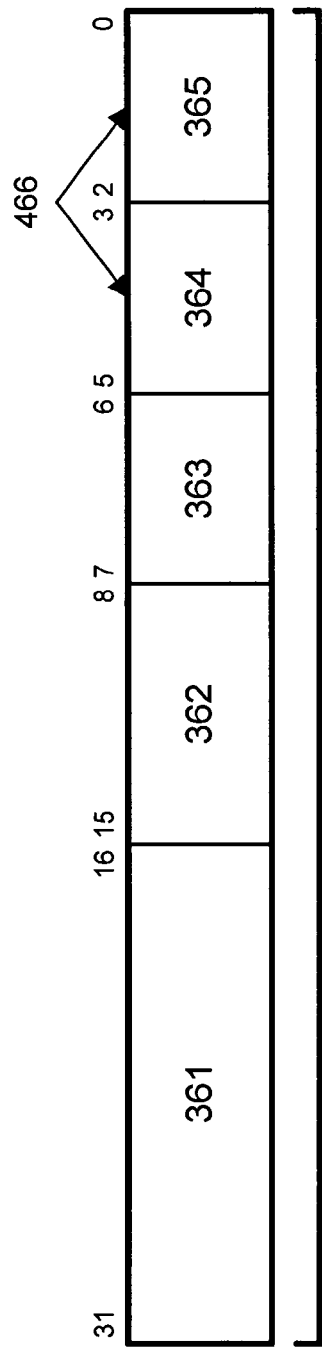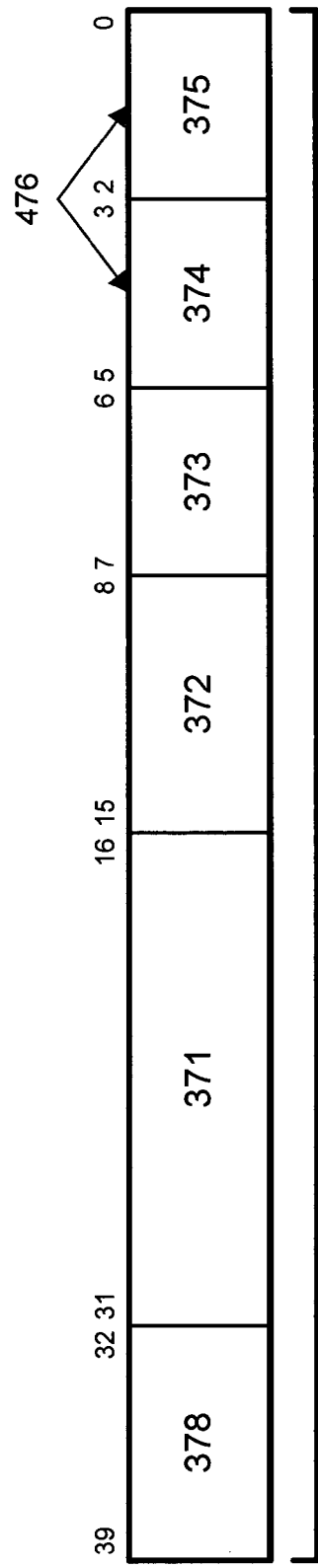

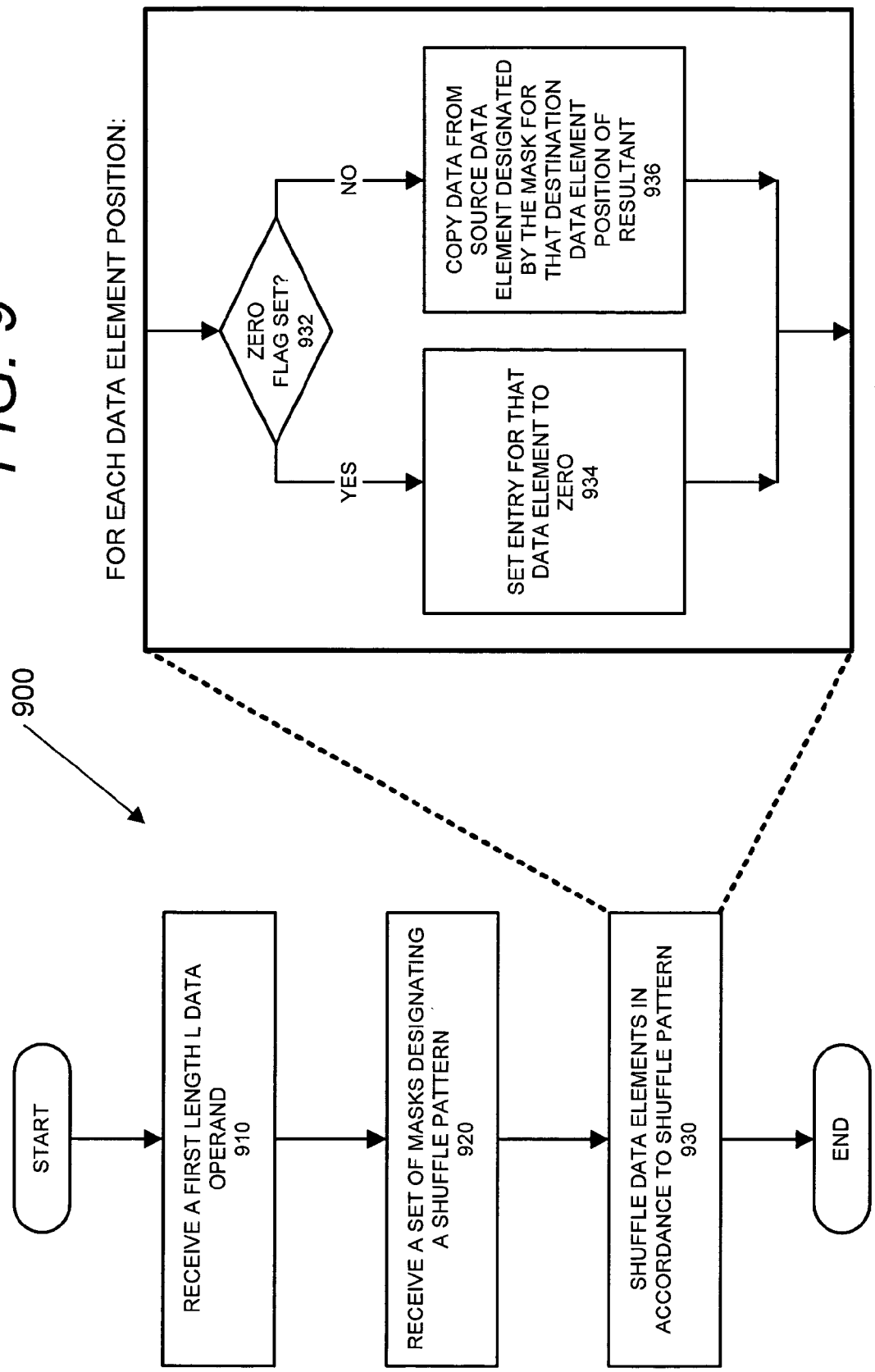

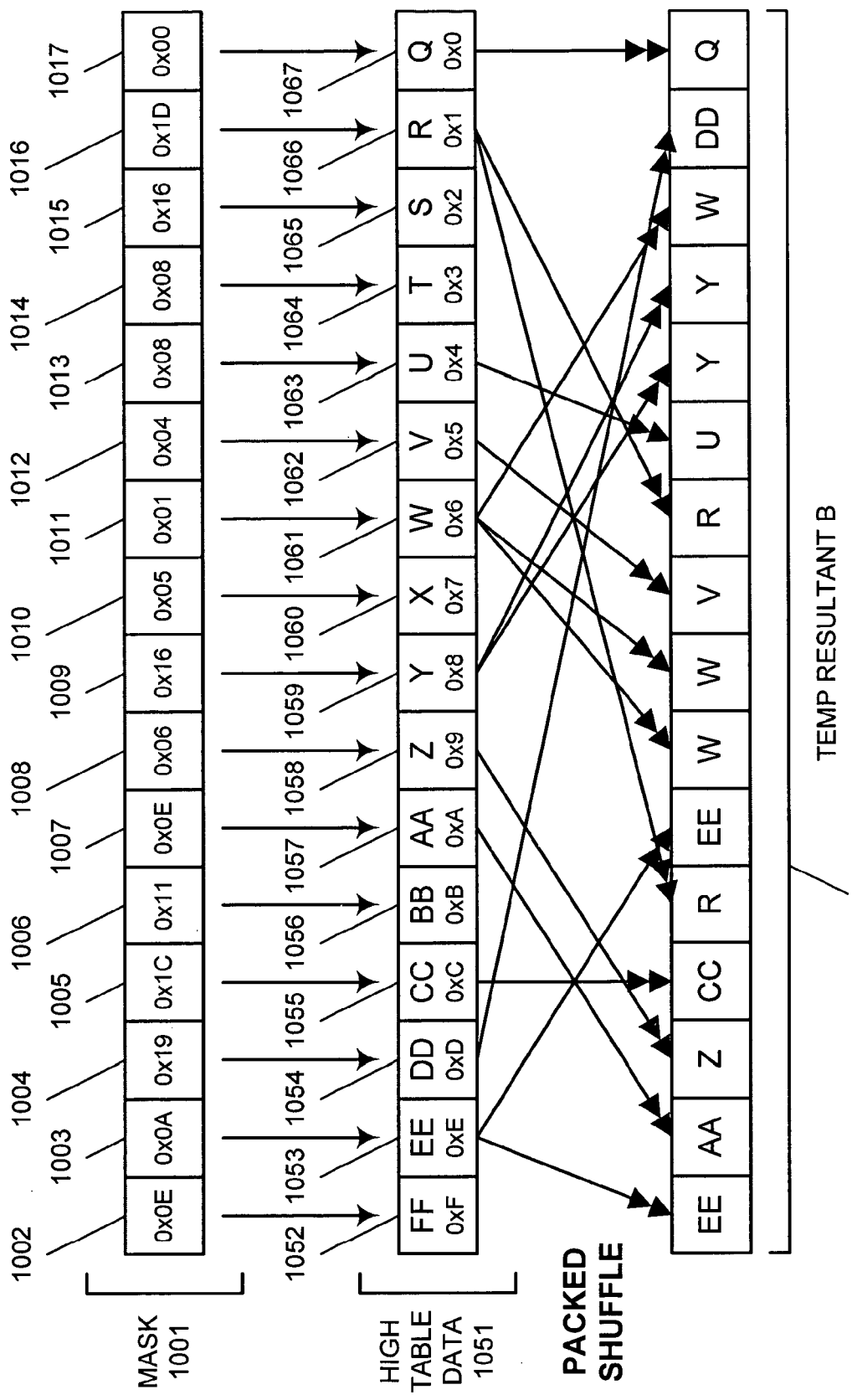

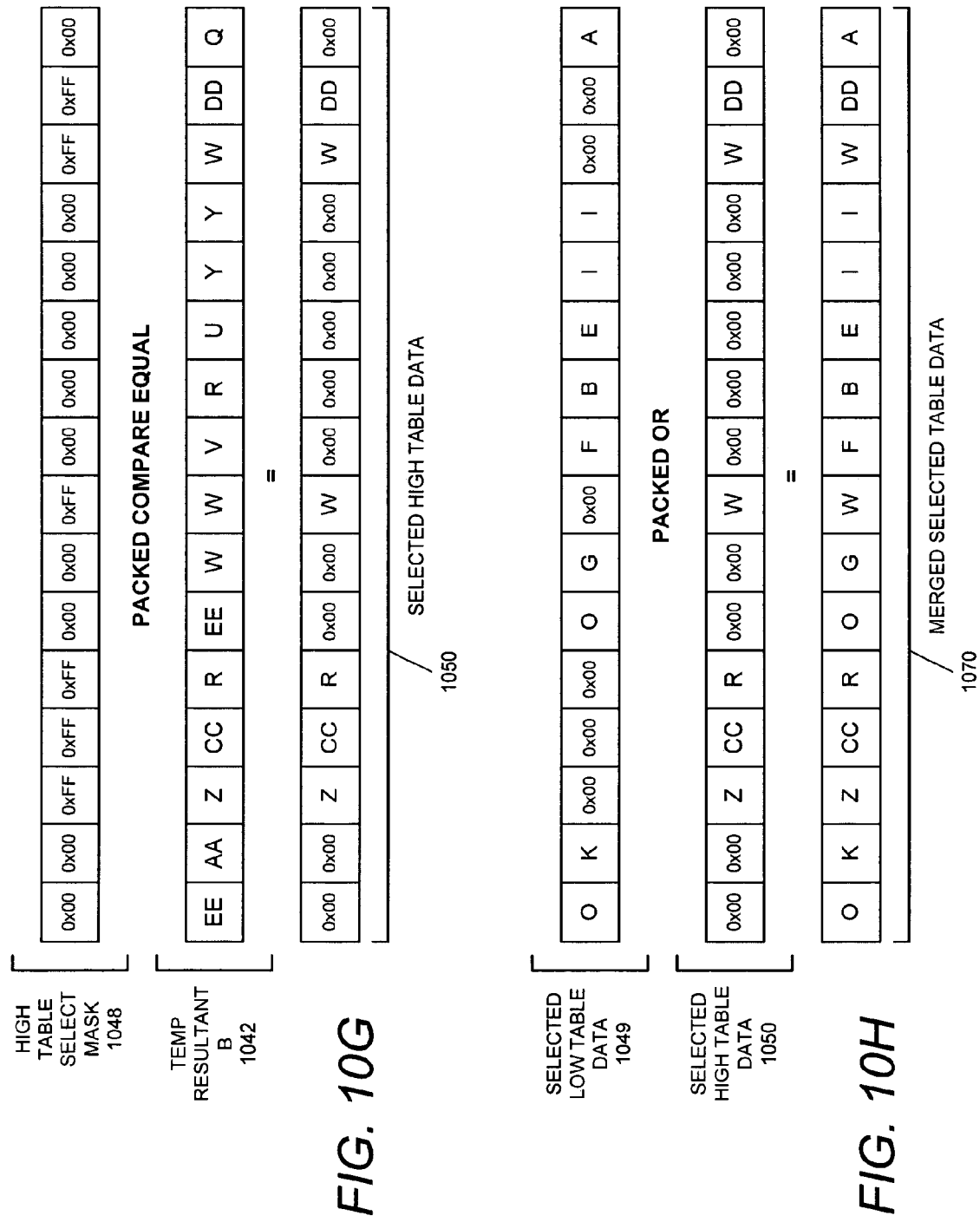

MASK A 1502: 0x05, 0x80, 0x80, 0x04, 0x80, 0x80, 0x03, 0x80, 0x80, 0x02, 0x80, 0x80, 0x01, 0x80, 0x80, 0x00

MASK B 1504: 0x80, 0x04, 0x80, 0x80, 0x03, 0x80, 0x80, 0x02, 0x80, 0x80, 0x80, 0x80, 0x80, 0x80, 0x00, 0x80

MASK C 1506: 0x80, 0x04, 0x04, 0x80, 0x03, 0x03, 0x80, 0x02, 0x02, 0x80, 0x01, 0x01, 0x80, 0x00, 0x00, 0x80

FIG. 15B

DATA A 1512: $R_{15}$ 0xF, $R_{14}$ 0xE, $R_{13}$ 0xD, $R_{12}$ 0xC, $R_{11}$ 0xB, $R_{10}$ 0xA, $R_9$ 0x9, $R_8$ 0x8, $R_7$ 0x7, $R_6$ 0x6, $R_5$ 0x5, $R_4$ 0x4, $R_3$ 0x3, $R_2$ 0x2, $R_1$ 0x1, $R_0$ 0x0

DATA B 1514: $G_{15}$ 0xF, $G_{14}$ 0xE, $G_{13}$ 0xD, $G_{12}$ 0xC, $G_{11}$ 0xB, $G_{10}$ 0xA, $G_9$ 0x9, $G_8$ 0x8, $G_7$ 0x7, $G_6$ 0x6, $G_5$ 0x5, $G_4$ 0x4, $G_3$ 0x3, $G_2$ 0x2, $G_1$ 0x1, $G_0$ 0x0

DATA C 1516: $B_{15}$ 0xF, $B_{14}$ 0xE, $B_{13}$ 0xD, $B_{12}$ 0xC, $B_{11}$ 0xB, $B_{10}$ 0xA, $B_9$ 0x9, $B_8$ 0x8, $B_7$ 0x7, $B_6$ 0x6, $B_5$ 0x5, $B_4$ 0x4, $B_3$ 0x3, $B_2$ 0x2, $B_1$ 0x1, $B_0$ 0x0

FIG. 15C  MASKED DATA A 1522: R₅, '0', '0', R₄, '0', '0', R₃, '0', '0', R₂, '0', '0', R₁, '0', '0', R₀

FIG. 15D  MASKED DATA B 1524: '0', G₄, '0', '0', G₃, '0', '0', G₂, '0', '0', G₁, '0', '0', G₀, '0'

FIG. 15E  MASKED DATA C 1526: '0', B₄, '0', '0', B₃, '0', '0', B₂, '0', '0', B₁, '0', '0', B₀, '0'

FIG. 15F  INTERLEAVED A & B DATA 1530: R₅, '0', G₄, R₄, '0', G₃, R₃, '0', G₂, R₂, '0', G₁, R₁, '0', G₀, R₀

FIG. 15G  INTERLEAVED A, B, & C DATA 1532: R₅, B₄, G₄, R₄, B₃, G₃, R₃, B₂, G₂, R₂, B₁, G₁, R₁, B₀, G₀, R₀

FIG. 15H

DATA B' 1542: G5 0x5, G6 0x6, G7 0x7, G8 0x8, G9 0x9, G10 0xA, G11 0xB, G12 0xC, G13 0xD, G14 0xE, G15 0xF, '0', '0', '0', '0', '0'

DATA C' 1544: B5 0x5, B6 0x6, B7 0x7, B8 0x8, B9 0x9, B10 0xA, B11 0xB, B12 0xC, B13 0xD, B14 0xE, B15 0xF, '0', '0', '0', '0', '0'

DATA A' 1546: R6 0x6, R7 0x7, R8 0x8, R9 0x9, R10 0xA, R11 0xB, R12 0xC, R13 0xD, R14 0xE, R15 0xF, '0', '0', '0', '0', '0', '0'

FIG. 15I

INTERLEAVED A', B', & C' DATA 1548: G5, B5, R6, G6, B6, R7, G7, B7, R8, G8, B8, R9, G9, B9, R10, G10

METHOD AND APPARATUS FOR SHUFFLING DATA

This patent application is a continuation of U.S. patent application Ser. No. 13/540,576 filed on Jul. 2, 2012, entitled "Method And Apparatus For Shuffling Data" which is a continuation of U.S. patent application Ser. No. 12/901,336 filed Oct. 8, 2010, now U.S. Pat. No. 8,225,075 entitled, "Method and Apparatus For Shuffling Data, which is a Continuation of Ser. No. 12/387,958, filed Mar. 31, 2009, now U.S. Pat. No. 8,214,626 entitled, "Method And Apparatus For Shuffling Data" which is a Divisional of U.S. patent application Ser. No. 10/611,344 filed Jun. 30, 2003, now abandoned entitled, "Method And Apparatus For Shuffling Data" which is a Continuation In Part application of U.S. patent application Ser. No. 09/952,891 filed Oct. 29, 2001, entitled, "Apparatus And Method For Efficient Filtering And Convolution Of Content Data" now U.S. Pat. No. 7,085,795, all of which are hereby incorporated by reference.

The patent application is related to the following: co-pending U.S. patent application Ser. No. 10/612,592, entitled "Method And Apparatus For Parallel Table Lookup Using SIMD Instructions" filed on Jun. 30, 2003; and co-pending U.S. patent application Ser. No. 10/612,061, entitled "Method And Apparatus For Rearranging Data Between Multiple Registers" filed on Jun. 30, 2003.

FIELD OF THE INVENTION

The present invention relates generally to the field of microprocessors and computer systems. More particularly, the present invention relates to a method and apparatus for shuffling data.

BACKGROUND OF THE INVENTION

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

As processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing experience will be even richer in audio-visual effects, as well as being easier to use, and more importantly, computing will merge with communications.

Accordingly, the display of images, as well as playback of audio and video data, which is collectively referred to as content, have become increasingly popular applications for current computing devices. Filtering and convolution operations are some of the most common operations performed on content data, such as image audio and video data. Such operations are computationally intensive, but offer a high level of data parallelism that can be exploited through an efficient implementation using various data storage devices, such as for example, single instruction multiple data (SIMD) registers. A number of current architectures also require unnecessary data type changes which minimizes instruction throughput and significantly increases the number of clock cycles required to order data for arithmetic operations.

BRIEF DESCRIPTION OF THE DRAWINGS

The present invention is illustrated by way of example and not limitations in the figures of the accompanying drawings, in which like references indicate similar elements, and in which:

FIG. 4A is an illustration of various packed data type representations in multimedia registers according to one embodiment of the present invention;

FIG. 4C illustrates one embodiment of an operation encoding (opcode) format for a shuffle instruction;

FIG. 4D illustrates an alternative operation encoding format;

FIG. 9 is a flow chart illustrating one embodiment of a method to shuffle data;

FIGS. 10A-H illustrate the operation of a parallel table lookup algorithm using SIMD instructions;

FIGS. 13A-C illustrates an algorithm for rearranging data between multiple registers;

FIGS. 15A-K illustrates an algorithm for shuffling data between multiple registers to generate interleaved data.

DETAILED DESCRIPTION

Figure 1A:
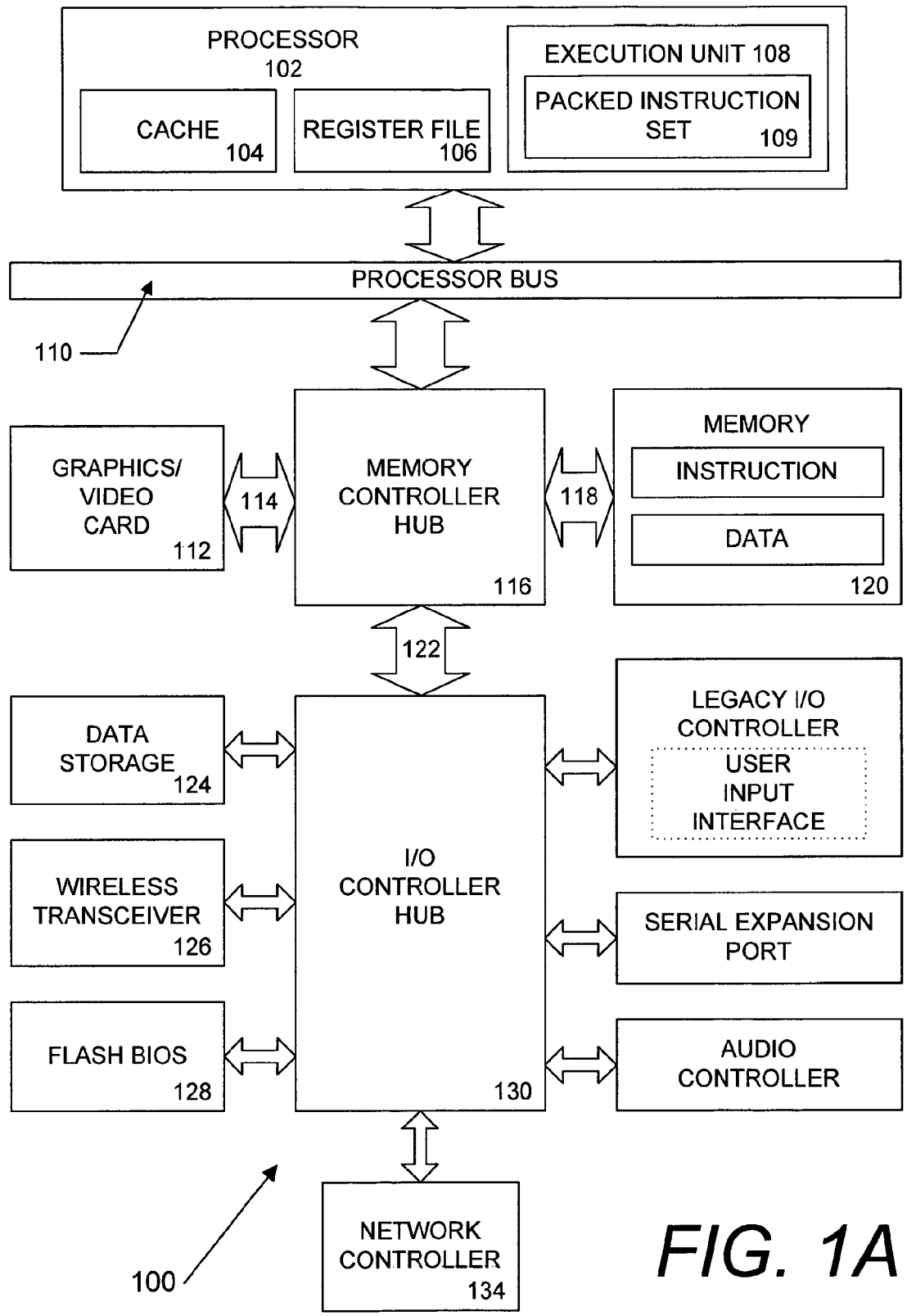
FIG. 1A is a block diagram of a computer system formed with a processor that includes execution units to execute an instruction for shuffling data in accordance with one embodiment of the present invention.

A method and apparatus for shuffling data is disclosed. A method and apparatus for parallel table lookup using SIMD instructions are also described. A method and apparatus for rearranging data between multiple registers is also disclosed. The embodiments described herein are described in the context of a microprocessor, but are not so limited. Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. However, the present invention is not limited to processors or machines that perform 256 bit, 128 bit, 64 bit, 32 bit, or 16 bit data operations and can be applied to any processor and machine in which shuffling of data is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

Although the below examples describe instruction handling and distribution in the context of execution units and logic circuits, other embodiments of the present invention can be accomplished by way of software. The present invention may be provided as a computer program product or software which may include a machine or computer-readable medium having stored thereon instructions which may be used to program a computer (or other electronic devices) to perform a process according to the present invention. Such software can be stored within a memory in the system. Similarly, the code can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

Furthermore, embodiments of integrated circuit designs in accordance with the present inventions can be communicated or transferred in electronic form as a database on a tape or other machine readable media. For example, the electronic form of an integrated circuit design of a processor in one embodiment can be processed or manufactured via a fab to obtain a computer component. In another instance, an integrated circuit design in electronic form can be processed by a machine to simulate a computer component. Thus the circuit layout plans and/or designs of processors in some embodiments can be distributed via machine readable mediums or embodied thereon for fabrication into a circuit or for simulation of an integrated circuit which, when processed by a machine, simulates a processor. A machine readable medium is also capable of storing data representing predetermined functions in accordance with the present invention in other embodiments.

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Embodiments of the present invention provide a way to implement a packed byte shuffle instruction with a flush to zero capability as an algorithm that makes use of SIMD related hardware. For one embodiment, the algorithm is based on the concept of shuffling data from a particular register or memory location based on the values of a control mask for each data element position. Embodiments of a packed byte shuffle can be used to reduce the number of instructions required in many different applications that rearrange data. A packed byte shuffle instruction can also be used for any application with unaligned loads. Embodiments of this shuffle instruction can be used for filtering to arrange data for efficient multiply-accumulate operations. Similarly, a packed shuffle instruction can be used in video and encryption applications for ordering data and small lookup tables. This instruction can be used to mix data from two or more registers. Thus embodiments of a packed shuffle with a flush to zero capability algorithm in accordance with the present invention can be implemented in a processor to support SIMD operations efficiently without seriously compromising overall performance.

Embodiments of the present invention provide a packed data shuffle instruction (PSHUFB) with a flush to zero capability for efficiently ordering and arranging data of any size. In one embodiment, data is shuffled or rearranged in a register with byte granularity. The byte shuffle operation orders data sizes, which are larger than bytes, by maintaining the relative position of bytes within the larger data during the shuffle operation. In addition, the byte shuffle operation can change the relative position of data in an SIMD register and can also duplicate data. This PSHUFB instruction shuffles bytes from a first source register in accordance to the contents of shuffle control bytes in a second source register. Although the instruction permutes the data, the shuffle mask is left unaffected and unchanged during this shuffle operation of this embodiment. The mnemonic for the one implementation is "PSHUFB register 1, register 2/memory", wherein the first and second operands are SIMD registers. However, the register of the second operand can also be replaced with a memory location. The first operand includes the source data for shuffling. For this embodiment, the register for the first operand is also the destination register. Embodiments in accordance to the present invention also include a capability of setting selected bytes to zero in addition to changing their position.

The second operand includes the set of shuffle control mask bytes to designate the shuffle pattern. The number of bits used to select a source data element is $\log_2$ of the number of data elements in the source operand. For instance, the number of bytes in a 128 bit register embodiment is sixteen. The $\log_2$ of sixteen is four. Thus four bits, or a nibble, is needed. The [3:0] index in the code below refers to the four bits. If the most significant bit (MSB), bit 7 in this embodiment, of the shuffle control byte is set, a constant zero is written in the result byte. If the least significant nibble of byte I of the second operand, the mask set, contains the integer J, then the shuffle instruction causes the $J^{th}$ byte of the first source register to be copied to the $I^{th}$ byte position of the destination register. Below is example pseudo-code for one embodiment of a packed byte shuffle operation on 128 bit operands:

```
For i = 0 to 15 {
    if (SRC2[(i*8)+7] == 1 )
        DEST[(i*8)+7...(i*8)+0] ← 0
    else
        index[3:0] ← SRC2[(i*8)+3 ... SRC2(i*8)+0]
        DEST[(i*8)+7...(i*8)+0] ← SRC1/DEST[(index*8+7)...(index*8+0)]
}
```

Similarly, this is example pseudo-code for another embodiment of a packed byte shuffle operation on 64 bit operands:

```
For i = 0 to 7 {
    if (SRC2[(i * 8)+7] == 1 )
        DEST[(i*8)+7...(i*8)+0] ← 0
    else
        index[2:0] ← SRC2[(i*8)+2 ... SRC2(i*8)+0]
        DEST[(i*8)+7...(i*8)+0] ← SRC1/DEST[(index*8+7)...(index*8+0)]
}
```

Note that in this 64 bit register embodiment, the lower three bits of the mask are used as there are eight bytes in a 64 bit register. The $\log_2$ of eight is three. The [2:0] index in the code above refers to the three bits. In alternative embodiments, the number of bits in a mask can vary to accommodate the number of data elements available in the source data. For example, a mask with lower five bits is needed to select a data element in a 256 bit register.

Presently, it is somewhat difficult and tedious to rearrange data in a SIMD register. Some algorithms require more instructions to arrange data for arithmetic operations than the actual number of instructions to execute those operations. By implementing embodiments of a packed byte shuffle instruction in accordance with the present invention, the number of instructions needed to achieve data rearrangement can be drastically reduced. For example, one embodiment of a packed byte shuffle instruction can broadcast a byte of data to all positions of a 128 bit register. Broadcasting data in a register is often used in filtering applications where a single data item is multiplied by many coefficients. Without this instruction, the data byte would have to be filtered from its source and shifted to the lowest byte position. Then, that single byte would have to be duplicated first as a byte, then that those two bytes duplicated again to form a doubleword, and that doubleword duplicated to finally form a quadword. All these operations can be replaced with a single packed shuffle instruction.

Similarly, the reversing of all the bytes in a 128 bit register, such as in changing between big endian and little endian formats, can be easily performed with a single packed shuffle instruction. Whereas even these fairly simple patterns require a number of instructions if a packed shuffle instruction were not used, complex or random patterns require even more inefficient instruction routines. The most straight forward solution to rearrange random bytes in a SIMD register is to write them to a buffer and then use integer byte reads/writes to rearrange them and read them back into a SIMD register. All these data processing would require a lengthy code sequence, while a single packed shuffle instructions can suffice. By reducing the number of instructions required, the number of clock cycles needed to produce the same result is greatly reduced. Embodiments of the present invention also use shuffle instructions to access multiple values in a table with a SIMD instructions. Even in the case where the a table is twice the size of a register, algorithms in accordance with the present invention allow for accesses to data elements at a faster rate than the one data element per instruction as with integer operations.

FIG. 1A is a block diagram of an exemplary computer system formed with a processor that includes execution units to execute an instruction for shuffling data in accordance with one embodiment of the present invention. System 100 includes a component, such as a processor 102 to employ execution units including logic to perform algorithms for shuffling data, in accordance with the present invention, such as in the embodiment described herein. System 100 is representative of processing systems based on the PENTIUM® III, PENTIUM® 4, Celeron®, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs integer shuffle operations on operands. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1A is a block diagram of a computer system 100 formed with a processor 102 that includes one or more execution units 108 to perform a data shuffle algorithm in accordance with the present invention. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a packed instruction set 109. In one embodiment, the packed instruction set 109 includes a packed shuffle instruction for organizing data. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute an algorithm with a shuffle instruction can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
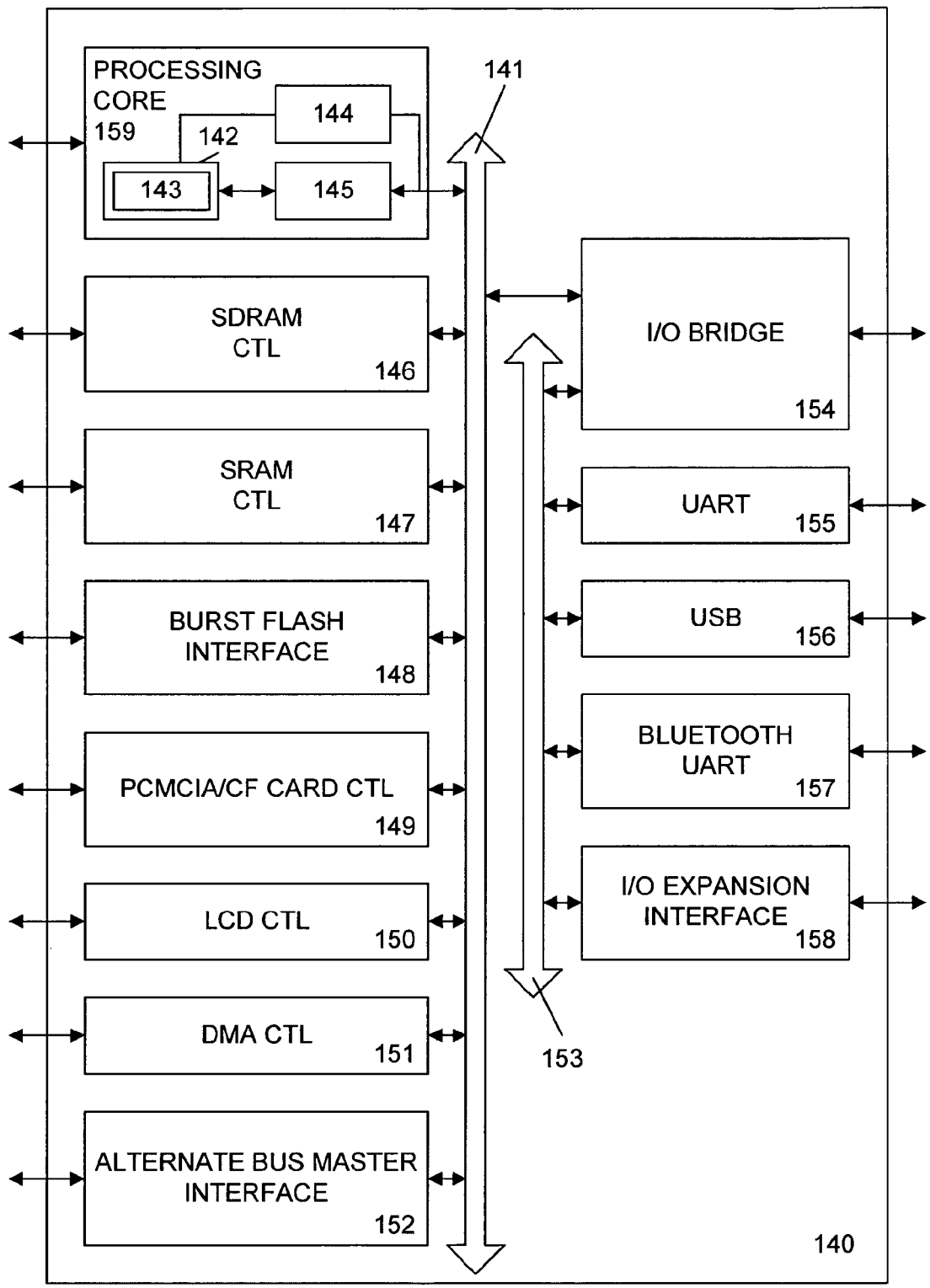
FIG. 1B is a block diagram of another exemplary computer system in accordance with an alternative embodiment of the present invention.

FIG. 1B illustrates an alternative embodiment of a data processing system 140 which implements the principles of the present invention. One embodiment of data processing system 140 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 140 comprises a processing core 159 capable of performing SIMD operations including a shuffle. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize instructions in packed instruction set 143 for performing operations on packed data formats. Packed instruction set 143 includes instructions for supporting shuffle operations, and may also include other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a shuffle operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
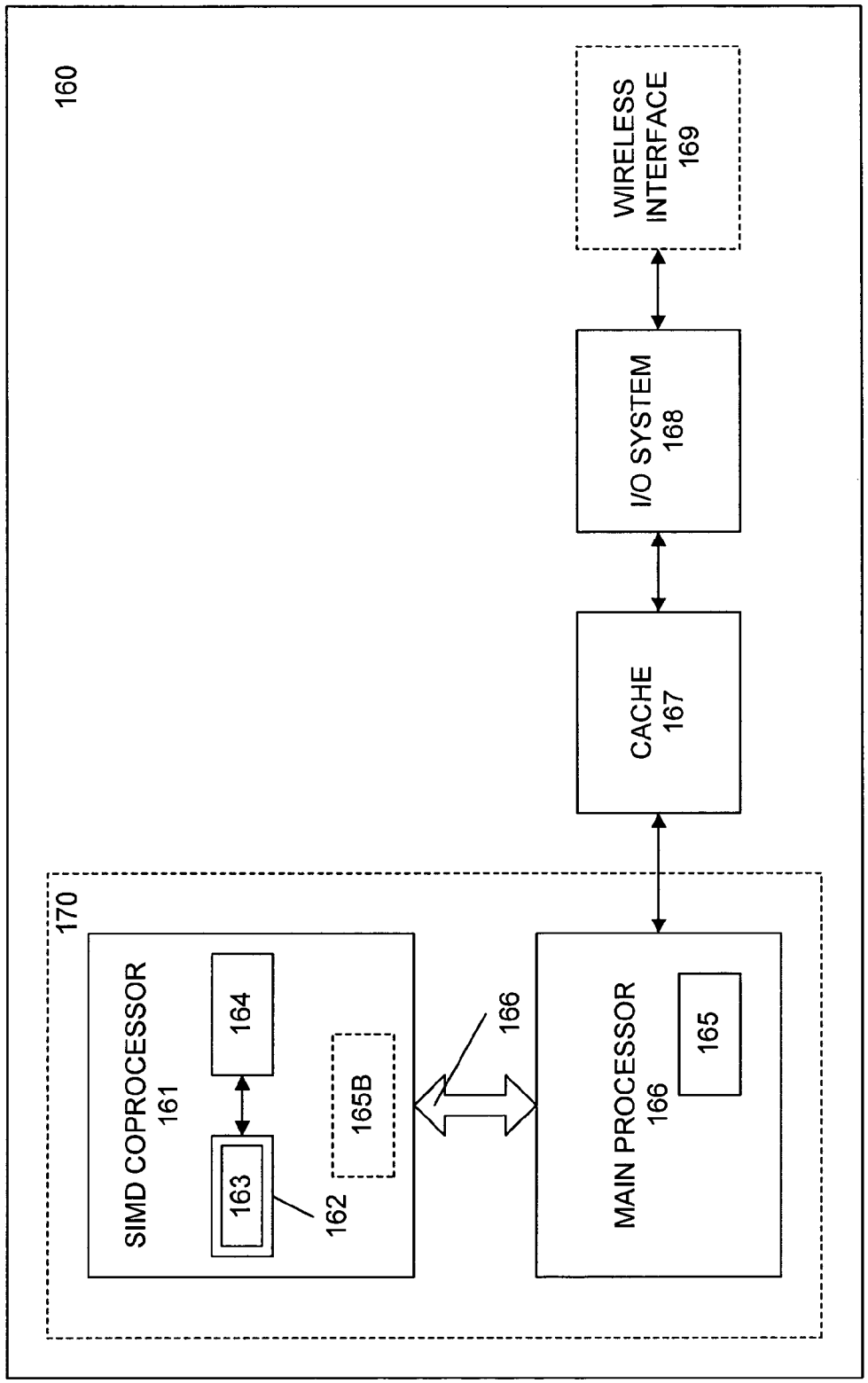
FIG. 1C is a block diagram of yet another exemplary computer system in accordance with another alternative embodiment of the present invention.

FIG. 1C illustrates yet alternative embodiments of a data processing system capable of performing SIMD shuffle operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing SIMD operations including data shuffles. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including SIMD shuffle instructions for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including SIMD shuffle instructions.

Figure 2:
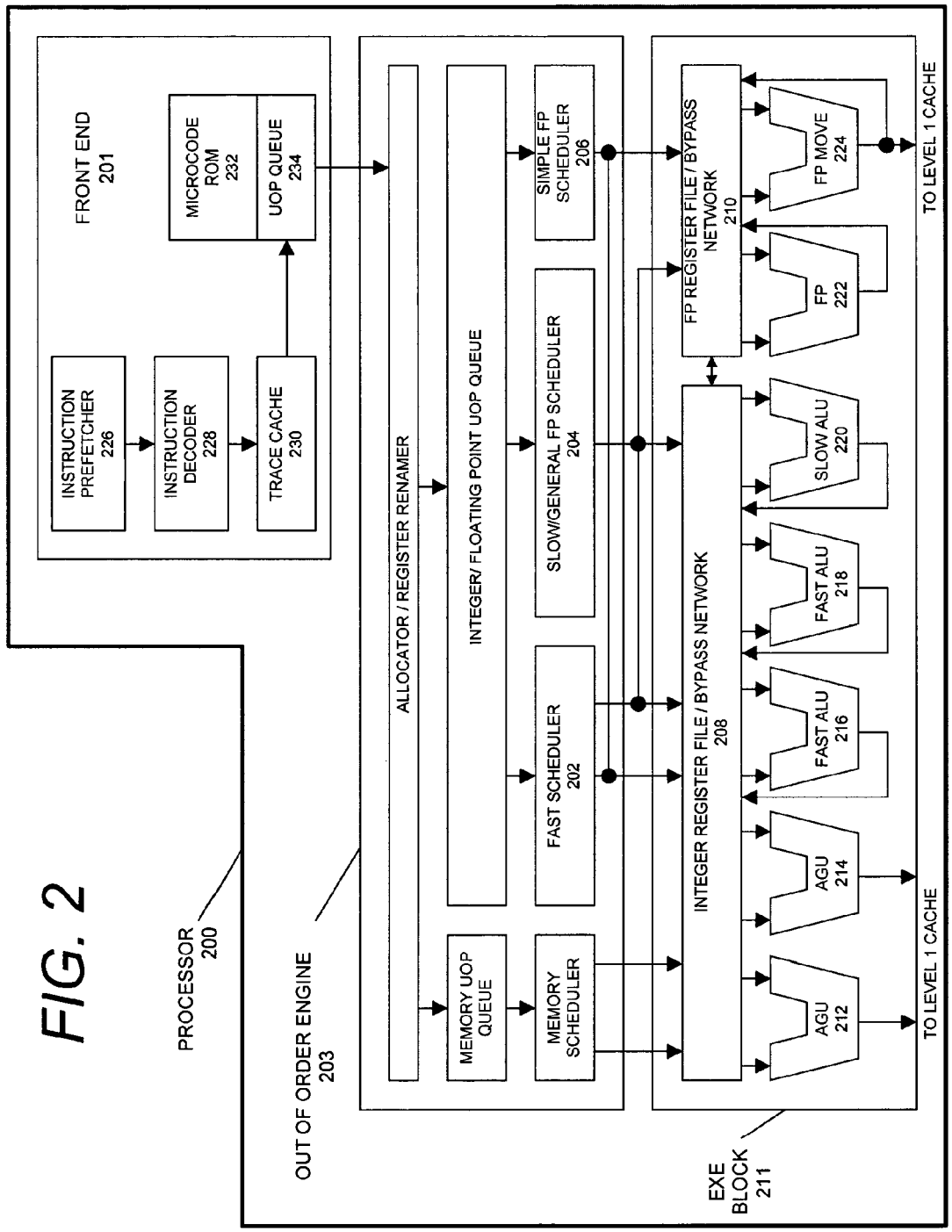
FIG. 2 is a block diagram of the micro-architecture for a processor of one embodiment that includes logic circuits to perform data shuffle operations in accordance with the present invention.

FIG. 2 is a block diagram of the micro-architecture for a processor 200 of one embodiment that includes logic circuits to perform shuffle operations in accordance with the present invention. The shuffle operation may also be referred to as a packed data shuffle operation and packed shuffle instruction as in the discussion above. For one embodiment of the shuffle instruction, the instruction can shuffle packed data with a byte granularity. That instruction can also be referred to as PSHUFB or packed shuffle byte. In other embodiments, the shuffle instruction can also be implemented to operate on data elements having sizes of word, doubleword, quadword, etc. The in-order front end 201 is the part of the processor 200 that fetches the macro-instructions to be executed and prepares them to be used later in the processor pipeline. The front end 201 of this embodiment includes several units. The instruction prefetcher 226 fetches macro-instructions from memory and feeds them to an instruction decoder 228 which in turn decodes them into primitives called micro-instructions or micro-operations (also called micro op or uops) that the machine know how to execute. The trace cache 230 takes decoded uops and assembles them into program ordered sequences or traces in the uop queue 234 for execution. When the trace cache 230 encounters a complex macro-instruction, the microcode ROM 232 provides the uops needed to complete the operation.

Many macro-instructions are converted into a single micro-op, and others need several micro-ops to complete the full operation. In this embodiment, if more than four micro-ops are needed to complete a macro-instruction, the decoder 228 accesses the microcode ROM 232 to do the macro-instruction. For one embodiment, a packed shuffle instruction can be decoded into a small number of micro ops for processing at the instruction decoder 228. In another embodiment, an instruction for a packed data shuffle algorithm can be stored within the microcode ROM 232 should a number of micro-ops be needed to accomplish the operation. The trace cache 230 refers to a entry point programmable logic array (PLA) to determine a correct micro-instruction pointer for reading the micro-code sequences for the shuffle algorithms in the microcode ROM 232. After the microcode ROM 232 finishes sequencing micro-ops for the current macro-instruction, the front end 201 of the machine resumes fetching micro-ops from the trace cache 230.

Some SIMD and other multimedia types of instructions are considered complex instructions. Most floating point related instructions are also complex instructions. As such, when the instruction decoder 228 encounters a complex macro-instruction, the microcode ROM 232 is accessed at the appropriate location to retrieve the microcode sequence for that macro-instruction. The various micro-ops needed for performing that macro-instruction are communicated to the out-of-order execution engine 203 for execution at the appropriate integer and floating point execution units.

The out-of-order execution engine 203 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of this embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of this embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of this embodiment is comprised of a number of execution units: address generation unit (AGU) 212, AGU 214, fast ALU 216, fast ALU 218, slow ALU 220, floating point ALU 222, floating point move unit 224. For this embodiment, the floating point execution blocks 222, 224, execute floating point, MMX, SIMD, and SSE operations. The floating point ALU 222 of this embodiment includes a floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider. On the other hand, non-floating point numbers and integer type are handled with integer hardware resources. The simple, very frequent ALU operations go to the high-speed ALU execution units 216, 218. The fast ALUs 216, 218, of this embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For this embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In this embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for shuffle operations.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32 bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operated with packed data elements that accompany SIMD and SSE instructions. Similarly, 128 bits wide XMM registers relating to SSE2 technology can also be used to hold such packed data operands. In this embodiment, in storing packed data and integer data, the registers do not need to differentiate between the two data types.

In the examples of the following figures, a number of data operands are described. For simplicity, the initial source data segments are labeled from letter A onwards alphabetically, wherein A is located at the lowest address and Z would be located at the highest address. Thus, A may initially be at address 0, B at address 1, C at address 3, and so on. Conceptually, a shuffle operation, as in the packed byte shuffle for one embodiment, entails shuffling data segments from a first operand and rearranging one or more of the source data elements into a pattern specified by a set of masks in a second operand. Thus, a shuffle can rotate or completely rearrange a portion of or all of the data elements into any desired order. Furthermore, any particular data element or number of data elements can be duplicated or broadcasted in the resultant. Embodiments of the shuffle instruction in accordance with the present invention include a flush to zero functionality wherein the mask for each particular data element can cause that data element position to be zeroed out in the resultant.

Figures 3A, 3B, 3C:
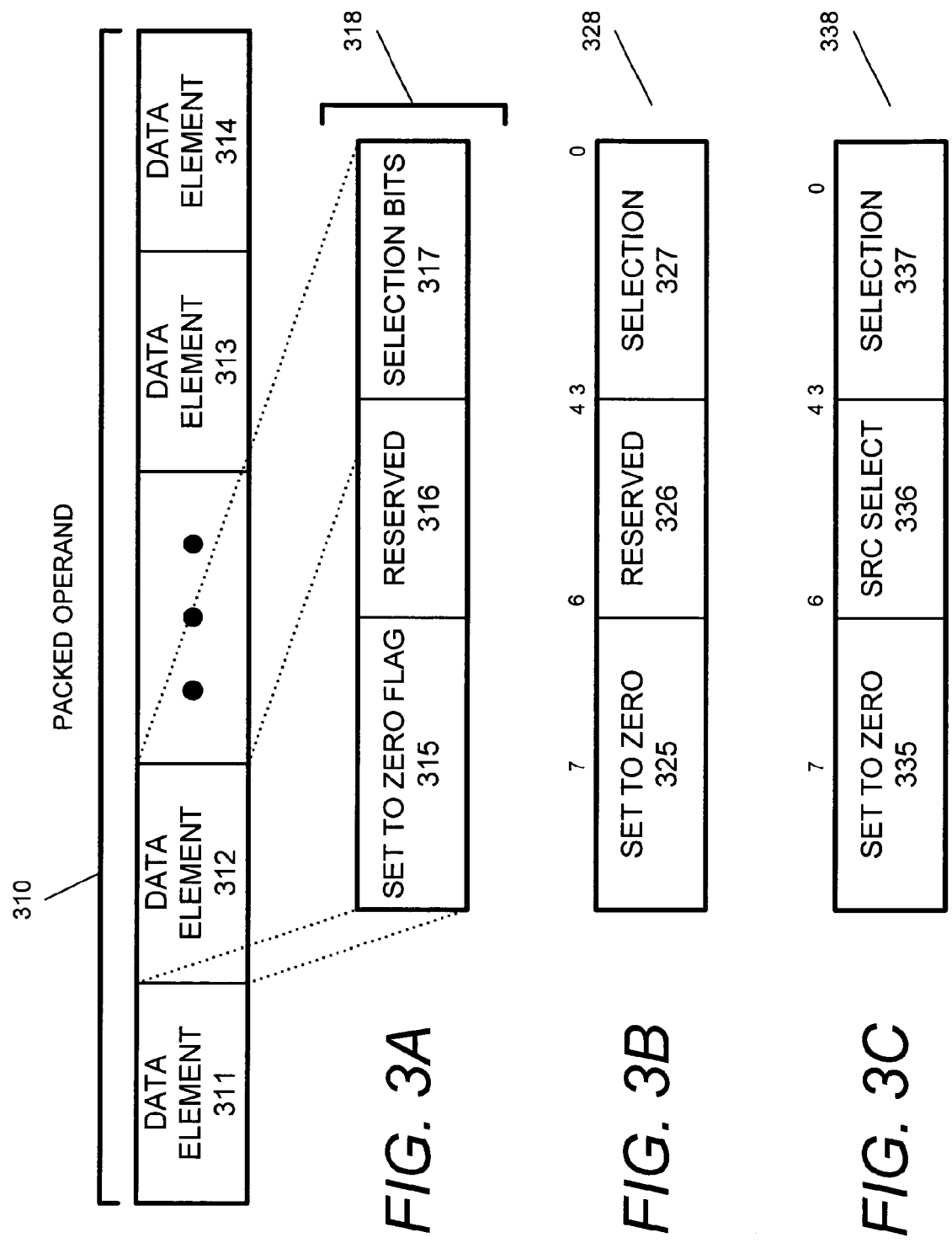
FIGS. 3A-C are illustrations of shuffle masks according to various embodiments of the present invention.

FIGS. 3A-C are illustrations of shuffle masks according to various embodiments of the present invention. A packed data operand 310 comprised of a plurality of individual data elements 311, 312, 313, 314, is shown in this example. The packed operand 310 of this example is described in the context of a packed data operand for containing a set of masks to indicate a shuffle pattern for corresponding packed data elements of another operand. Thus, the mask in each of the data elements 311, 312, 313, 314, of packed operand 310 designates the contents in the corresponding data element position of the resultant. For example, data element 311 is in the leftmost data element position. The mask in data element 311 is to designate what data should be shuffled or placed in the leftmost data element position of the resultant for the shuffle operation. Similarly, data element 312 is the second leftmost data element position. The mask in data element 312 is to designate what data should be placed in the second leftmost data element position of the resultant. For this embodiment, each of the data elements in the packed operand containing the shuffle masks has a one to one correspondence to a data element position in the packed resultant.

In FIG. 3A, data element 312 used to describe the contents of an example shuffle mask for one embodiment. The shuffle mask 318 for one embodiment is comprised of three portions: a 'set to zero flag' field 315, a 'reserved' field 316, and a 'selections bits' field 317. The 'set to zero flag' field 315 is to indicate whether the resultant data element position designated by the present mask should be zeroed out, or in other words, replaced with a value of zero ('0'). In one embodiment, the 'set to zero flag' field is dominant wherein if the 'set to zero flag' field 315 is set, the rest of the fields in the mask 318 are ignored and the resultant data element position is filled with '0'. The 'reserved' field 316 includes one or more bits that may or may not be used in alternative embodiments or may have been reserved for future or special use. The 'selection bits' field 317 of this shuffle mask 318 is to designate the source of the data for the corresponding data element position in the packed resultant.

For one embodiment of a packed data shuffle instruction, one operand is comprised of a set of masks and another operand is comprised of a set of packed data elements. Both operands are of the same size. Depending on the number of the data elements in the operands, a varying number of selection bits are needed to select an individual data element from the second packed data operand for placement in the packed resultant. For example, with a 128 bit source operand of packed bytes, at least four selection bits are needed as sixteen byte data elements are available for selection. Based on the value indicated by the selection bits of the mask, the appropriate data element from the source data operand is placed in the corresponding data element position for that mask. For example, the mask 318 of data element 312 corresponds to the second leftmost data element position. If the selection bits 317 of this mask 318 contain a value of 'X', the data element from data element position 'X' in the source data operand is shuffled into the second leftmost data element position in the resultant. But if the 'set to zero flag' field 315 is set, the second leftmost data element position in the resultant is replaced with '0' and the designation of the selection bits 317 ignored.

FIG. 3B illustrates the structure of a mask 328 for one embodiment that operates with byte size data elements and 128 bit wide packed operands. For this embodiment, the 'set to zero' field 325 is comprised of bit 7 and the 'selection' field 327 is comprised of bits 3 through 0 as there are sixteen possible data element selections. Bits 6 through 4 are not used in this embodiment and reside in the 'reserved' field 326. In another embodiment, the number of bits used in the 'selection' field 327 can be increased or decreased as needed in order to accommodate the number of possible data element selections available in the source data operand.

FIG. 3C illustrates the structure of a mask 338 for another embodiment that operates with byte size data elements and 128 bit wide packed operands, but with multiple data element sources. In this embodiment, the mask 338 is comprised of a 'set to zero' field 335, a 'source (src) select' field 336, and a 'selection' field 337. The 'set to zero' field 335 and 'selection' field 337 function similar to the descriptions above. The 'source select' field 336 of this embodiment is to indicate from which data source the data operand specified by the selection bits should be obtained. For example, the same set of masks may be used with multiple data sources such as a plurality of multimedia registers. Each source multimedia register is assigned a numeric value and the value in the 'source select' field 336 points to one of these source registers. Depending on the contents of the 'source select' field 336, the selected data element is selected from the appropriate data source for placement at that corresponding data element position in the packed resultant.

FIG. 4A is an illustration of various packed data type representations in multimedia registers according to one embodiment of the present invention. FIG. 4A illustrates a data types for packed byte 410, packed word 420, and a packed doubleword (dword) 430 for 128 bits wide operands. The packed byte format 410 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a operand (single register or memory location) with other data elements of the same length. In packed data sequences relating to SSE2 technology, the number of data elements stored in an operand (XMM register or memory location) is 128 bits divided by the length in bits of an individual data element. Similarly, in packed data sequences relating to MMX and SSE technology, the number of data elements stored in an operand (MMX register or memory location) is 64 bits divided by the length in bits of an individual data element. The packed word format 420 of this example is 128 bits long and contains eight packed word data elements. Each packed word contains sixteen bits of information. The packed doubleword format 430 of FIG. 4A is 128 bits long and contains four packed doubleword data elements. Each packed doubleword data element contains thirty two bits of information. A packed quadword is 128 bits long and contains two packed quad-word data elements.

Figure 4B:
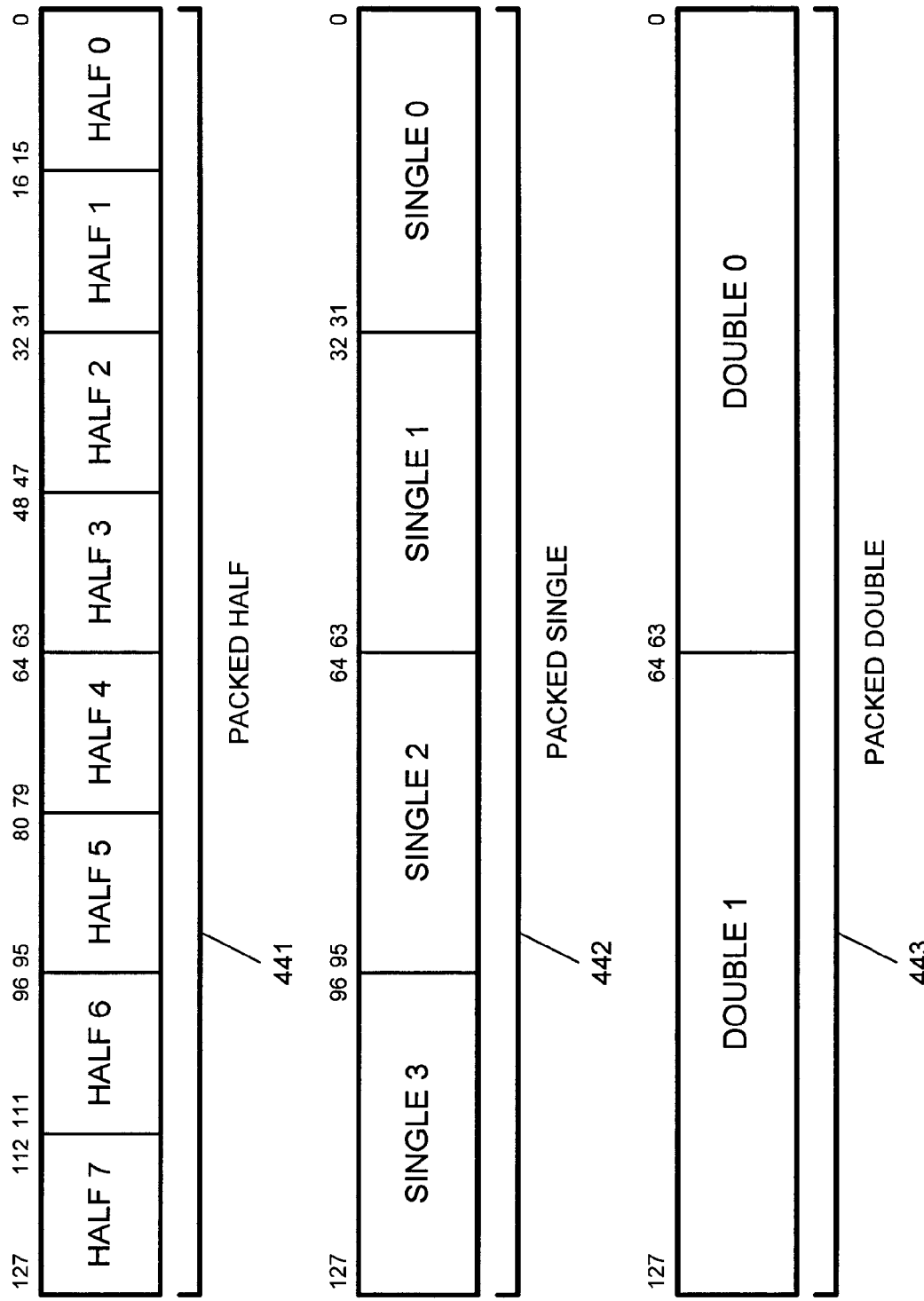
FIG. 4B illustrates packed data-types in accordance with an alternative embodiment.

FIG. 4B illustrates alternative in-register data storage formats. Each packed data can include more than one independent data element. Three packed data formats are illustrated; packed half 441, packed single 442, and packed double 443. One embodiment of packed half 441, packed single 442, and packed double 443 contain fixed-point data elements. For an alternative embodiment one or more of packed half 441, packed single 442, and packed double 443 may contain floating-point data elements. One alternative embodiment of packed half 441 is one hundred twenty-eight bits long containing eight 16-bit data elements. One embodiment of packed single 442 is one hundred twenty-eight bits long and contains four 32-bit data elements. One embodiment of packed double 443 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 4C is a depiction of one embodiment of an operation encoding (opcode) format 460, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. The type of shuffle operation, may be encoded by one or more of fields 461 and 462. Up to two operand locations per instruction may be identified, including up to two source operand identifiers 464 and 465. For one embodiment of a shuffle instruction, destination operand identifier 466 is the same as source operand identifier 464. For an alternative embodiment, destination operand identifier 466 is the same as source operand identifier 465. Therefore, for embodiments of a shuffle operation, one of the source operands identified by source operand identifiers 464 and 465 is overwritten by the results of the shuffle operations. For one embodiment of the shuffle instruction, operand identifiers 464 and 465 may be used to identify 64-bit source and destination operands.

FIG. 4D is a depiction of another alternative operation encoding (opcode) format 470, having forty or more bits. Opcode format 470 corresponds with opcode format 460 and comprises an optional prefix byte 478. The type of shuffle operation, may be encoded by one or more of fields 478, 471, and 472. Up to two operand locations per instruction may be identified by source operand identifiers 474 and 475 and by prefix byte 478. For one embodiment of the shuffle instruction, prefix byte 478 may be used to identify 128-bit source and destination operands. For one embodiment of the shuffle instruction, destination operand identifier 476 is the same as source operand identifier 474. For an alternative embodiment, destination operand identifier 476 is the same as source operand identifier 475. Therefore, for embodiments of shuffle operations, one of the source operands identified by source operand identifiers 474 and 475 is overwritten by the results of the shuffle operations. Opcode formats 460 and 470 allow register to register, memory to register, register by memory, register by register, register by immediate, register to memory addressing specified in part by MOD fields 463 and 473 and by optional scale-index-base and displacement bytes.

Figure 4E:
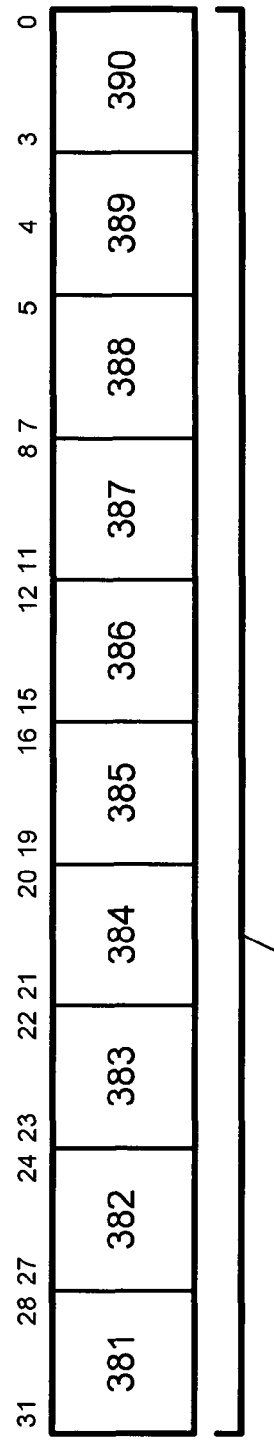
FIG. 4E illustrates yet another alternative operation encoding format.

Turning next to FIG. 4E, in some alternative embodiments, 64 bit single instruction multiple data (SIMD) arithmetic operations may be performed through a coprocessor data processing (CDP) instruction. Operation encoding (opcode) format 480 depicts one such CDP instruction having CDP opcode fields 482 and 489. The type of CDP instruction, for alternative embodiments of shuffle operations, may be encoded by one or more of fields 483, 484, 487, and 488. Up to three operand locations per instruction may be identified, including up to two source operand identifiers 485 and 490 and one destination operand identifier 486. One embodiment of the coprocessor can operate on 8, 16, 32, and 64 bit values. For one embodiment, the shuffle operation is performed on fixed-point or integer data elements. In some embodiments, a shuffle instruction may be executed conditionally, using condition field 481. For some shuffle instructions source data sizes may be encoded by field 483. In some embodiments of a shuffle instruction, Zero (Z), negative (N), carry (C), and overflow (V) detection can be done on SIMD fields. For some instructions, the type of saturation may be encoded by field 484.

Figure 5:
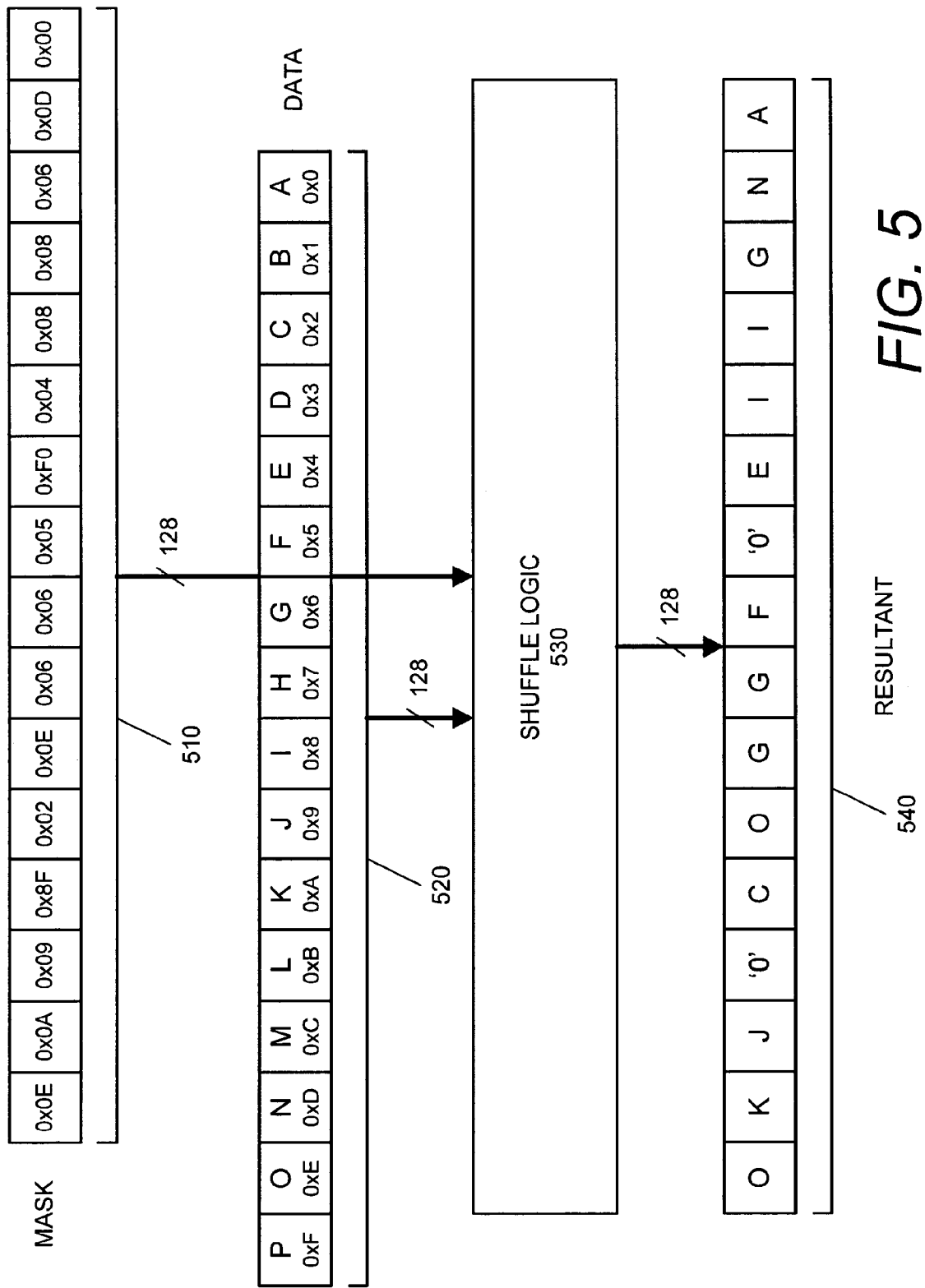
FIG. 5 is a block diagram of one embodiment of logic to perform a shuffle operation on a data operand based on a shuffle mask in accordance with the present invention.

FIG. 5 is a block diagram of one embodiment of logic to perform a shuffle operation on a data operand based on a shuffle mask in accordance with the present invention. The instruction (PSHUFB) for shuffle operation with a set to zero capability of this embodiment begins with two pieces of information a first (mask) operand 510 and a second (data) operand 520. For the following discussions, MASK, DATA, and RESULTANT are generally referred to as operands or data blocks, but not restricted as such, and also include registers, register files, and memory locations. In one embodiment, the shuffle PSHUFB instruction is decoded into one micro-operation. In an alternative embodiment, the instruction may be decoded into a various number of micro-ops to perform the shuffle operation on the data operands. For this example, the operands 510, 520, are 128 bit wide pieces of information stored in a source register/memory having byte wide data elements. In one embodiment, the operands 510, 520, are held in 128 bit long SIMD registers, such as 128 bit SSE2 XMM registers. However, one or both of the operands 510, 520, can also be loaded from a memory location. For one embodiment, the RESULTANT 540 is also a MMX or XMM data register. Furthermore, RESULTANT 540 may also be the same register or memory location as one of the source operands. Depending on the particular implementation, the operands and registers can be other widths such as 32, 64, and 256 bits, and have word, doubleword, or quadword sized data elements. The first operand 510 in this example is comprised of a set of sixteen masks (in hexadecimal format): 0x0E, 0x0A, 0x09, 0x8F, 0x02, 0x0E, 0x06, 0x06, 0x06, 0xF0, 0x04, 0x08, 0x08, 0x06, 0x0D, and 0x00. Each individual mask is to specify the contents of its corresponding data element position in the resultant 540.

The second operand 520 is comprised of sixteen data segments: P, O, N, M, L, K, J, I, H, G, F, E, D, C, B, and A. Each data segment in the second operand 520 is also labeled with a data element position value in hex format. The data segments here are of equal length and each comprise of a single byte (8 bits) of data. If each data element was a word (16 bits), doubleword (32 bits), or a quadword (64 bits), the 128 bit operands would have eight word wide, four doubleword wide, or two quadword wide data elements, respectively. However, another embodiment of the present invention can operate with other sizes of operands and data segments. Embodiments of the present invention are not restricted to particular length data operands, data segments, or shift counts, and can be sized appropriately for each implementation.

The operands 510, 520, can reside either in a register or a memory location or a register file or a mix. The data operands 510, 520, are sent to the shuffle logic 530 of an execution unit in the processor along with a shuffle instruction. By the time the shuffle instruction reaches the execution unit, the instruction should have been decoded earlier in the processor pipeline. Thus the shuffle instruction can be in the form of a micro operation (uop) or some other decoded format. For this embodiment, the two data operands 510, 520, are received at shuffle logic 530. The shuffle logic 530 selects data elements from the source data operand 520 based on the values in the mask operand 510 and arranges/shuffles the selected data elements into the appropriate positions in the resultant 540. The shuffle logic 530 also zeroes out the given data element positions in the resultant 540 as specified. Here, the resultant 540 is comprised of sixteen data segments: O, K, J, '0', C, O, G, G, F, '0', E, I, I, G, N, and A.

The operation of the shuffle logic 530 is described here with a couple few of the data elements. The shuffle mask for the leftmost data element position in the mask operand 510 is 0x0E. The shuffle logic 530 interprets the various fields of the mask described as above in FIG. 3A-C. In this case, the 'set to zero' field is not set. The selection field, comprising the lower four bits or nibble, has a hex value of 'E'. The shuffle logic 530 shuffles the data, 0, in the data element position '0xE' of the data operand 520 to the leftmost data element position of the resultant 540. Similarly, the mask at the second leftmost data element position in the mask operand 510 is 0x0A. The shuffle logic 530 interprets the mask for that position. This selection field has a hex value of 'A'. The shuffle logic 530 copies the data, K, in the data element position '0xA' of the data operand 520 to the second leftmost data element position of the resultant 540.

The shuffle logic 530 of this embodiment also supports the flush to zero function of the shuffle instruction. The shuffle mask at the fourth data element position from the left for the mask operand 510 is 0x8F. The shuffle logic 510 recognizes that the 'set to zero' field is set as indicated by a '1' at bit 8 of the mask. In response, the flush to zero directive trumps the selection field and the shuffle logic 510 ignores the hex value 'F' in the selection field of that mask. A '0' is placed in the corresponding fourth data element position from the left in the resultant 540. For this embodiment, the shuffle logic 530 evaluates the 'set to zero' and selection fields for each mask and does not care about the other bits that may exist outside of those fields in the mask, such as reserved bits or a source select field. This processing of the shuffle masks and data shuffling is repeated for the entire set of masks in the mask operand 510. For one embodiment, the masks are all processed in parallel. In another embodiment, a certain portion of the mask set and data elements can be processed together at a time.

With embodiments of the present shuffle instruction, data elements in an operand can be rearranged in various ways. Furthermore, certain data from particular data element can be repeated at multiple data element positions or even broadcasted to every position. For instance, the fourth and fifth masks both have a hex value of 0x08. As a result, the data, I, at data element position 0x8 of the data operand 520 is shuffled into both the fourth and fifth data element positions from the right side of the resultant 540. With the set to zero functionality, embodiments of the shuffle instruction can force any of the data element positions in the resultant 540 to '0'.

Depending on the particular implementation, each shuffle mask can be used to designate the content of a single data element position in the resultant. As in this example, each individual byte wide shuffle mask corresponds to a byte wide data element position in the resultant 540. In another embodiment, combinations of multiple masks can be used to designate blocks of data elements together. For example, two byte wide masks can be used together to designate a word wide data element. Shuffle masks are not restricted to being byte wide and can be any other size needed in that particular implementation. Similarly, data elements and data element positions can possess other granularities other than bytes.

Figure 6:
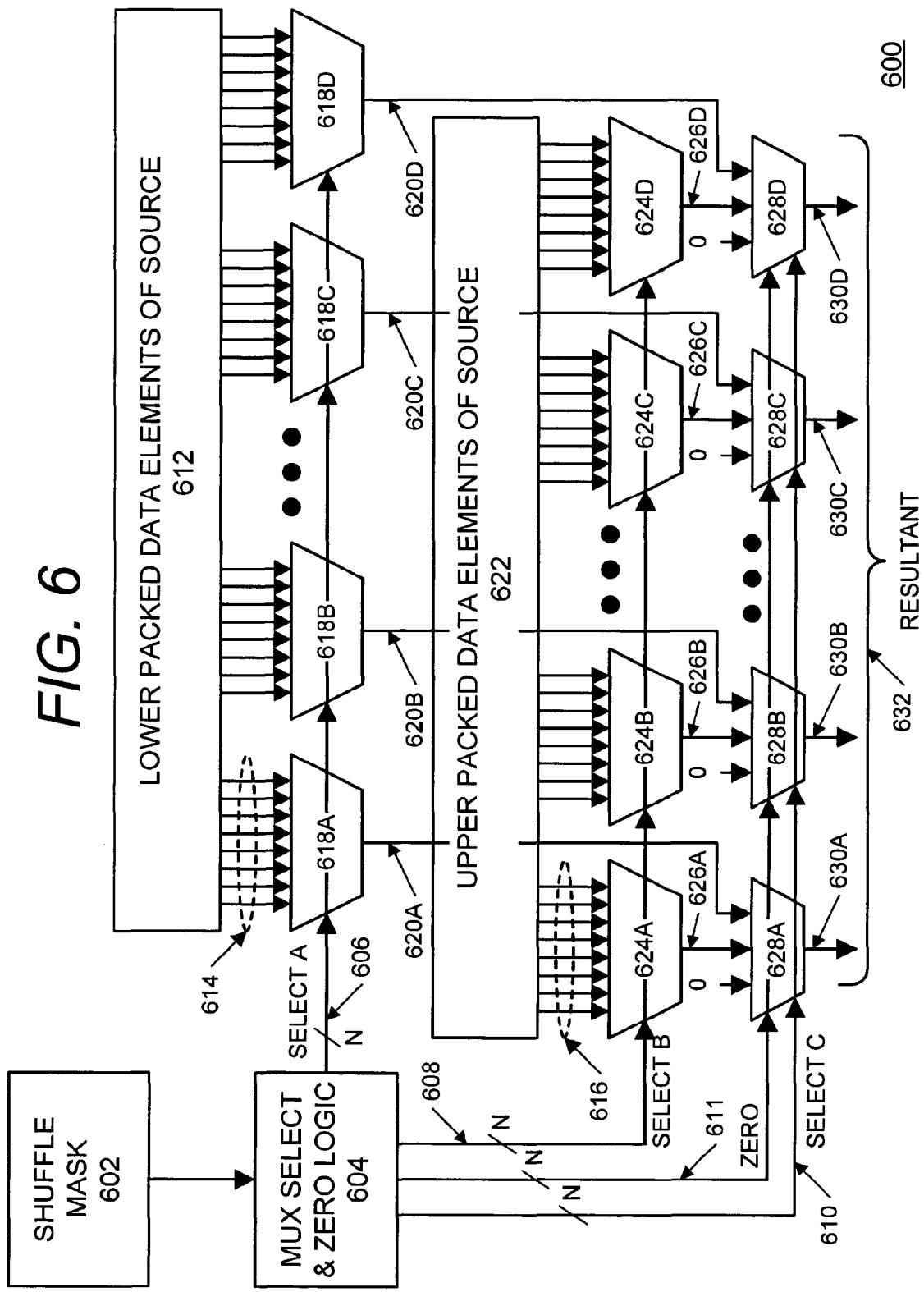
FIG. 6 is a block diagram of one embodiment of a circuit for performing a data shuffling operation in accordance with the present invention.

FIG. 6 is a block diagram of one embodiment of a circuit 600 for performing a data shuffling operation in accordance with the present invention. The circuit of this embodiment comprises a multiplexing structure to select the correct result byte from the first source operand based on decoding shuffle mask of the second operand. The source data operand here is comprised of the upper packed data elements and the lower packed data elements. The multiplexing structure of this embodiment is relatively simpler than other multiplexing structures used to implement other packed instructions. As a result, the multiplexing structure of this embodiment does not introduce any new critical timing path. The circuit 600 of this embodiment includes a shuffle mask block, blocks to hold lower/upper packed data elements from source operands, a first plurality of eight to one (8:1) muxes for initial selection of data elements, another plurality of three to one (3:1) muxes for selection of upper and lower data elements, mux select & zero logic and a multitude of control signals. For simplicity, a limited number of the 8:1 and 3:1 muxes are shown in FIG. 6 and represented by dots. However, their function is similar to those illustrated and can be understood from the description below.

During a shuffle operation in this example, two operands are received at this shuffle handling circuit 600: a first operand with a set of packed data elements and a second operand with a set of shuffle masks. The shuffle masks are propagated to shuffle mask block 602. The set of shuffle masks are decoded at the mux select and zero logic block 604 to generate a variety of select signals (SELECT A 606, SELECT B 608, SELECT C 610) and a set to zero signal (ZERO) 611. These signals are used to control the operation of the muxes in piecing together the resultant 632.

For this example, the mask operand and data operand are both 128 bits long and each are packed with of sixteen byte size data segments. The value N as shown on various signals is sixteen in this case. In this embodiment, the data elements are separated into a set of lower and upper packed data elements, each set having eight data elements. This allows for the use of smaller 8:1 muxes during the data element selection rather than 16:1 muxes. These lower and upper sets of packed data elements are held at lower and upper storage areas 612, 622, respectively. Starting with the lower data set, each of the eight data elements are sent to the first set of sixteen individual 8:1 muxes 618A-D via a set of lines such as routing lines 614. Each of the sixteen 8:1 muxes 618A-D are controlled with one of the N SELECT A signals 606. Depending on the value of its SELECT A 606, that mux is to output one of the eight lower data elements 614 for further processing. There are sixteen 8:1 muxes for the set of lower packed data elements as it is possible to shuffle any of the lower data elements into any of the sixteen resultant data element positions. Each of the sixteen 8:1 muxes is for one of the sixteen resultant data element positions. Similarly, sixteen 8:1 muxes are present for the upper packed data elements. The eight upper data elements are sent to each of the second set of sixteen 8:1 muxes 624A-D. Each of the sixteen 8:1 muxes 624A-D are controlled with one of the N SELECT B signals 608. Based on the values of its SELECT B 608, that 8:1 mux is to output one of the eight upper data elements 616 for further processing.

Each of the sixteen 3:1 muxes 628A-D corresponds to a data element position in the resultant 632. The sixteen outputs 620A-D from the sixteen lower data muxes 618A-D are routed to a set of sixteen 3:1 upper/lower selection muxes 628A-D as are the outputs 626A-D from the upper data muxes 624A-D. Each of these 3:1 selection muxes 628D-D receives its own SELECT C 610 and a ZERO 611 signals from the mux select & zero logic 604. The value on the SELECT C 610 for that 3:1 mux is to indicate whether the mux is to output the selected data operand from the lower data set or from the upper data set. The control signal ZERO 611 to each 3:1 mux is to indicate whether that mux should force its output to zero ('0'). For this embodiment, the control signal ZERO 611 supercedes the selection on SELECT C 610 and forces the output for that data element position to '0' in the resultant 632.

For example, 3:1 mux 628A receives the selected lower data element 620A from 8:1 mux 618A and the selected upper data element 626A from 8:1 mux 624A for that data element position. SELECT C 610 controls which of the data elements to shuffle at its output 630A into the data element position it manages in the resultant 632. However, if signal ZERO 611 to the mux 628A is active, indicated that the shuffle mask for that data element position states that a '0' is desired, the mux output 630A is '0' and neither of the data element inputs 620A, 626A, are used. The resultant 632 of the shuffle operation is composed of the outputs 630A-D from the sixteen 3:1 muxes 628A-D, wherein each output corresponds to a specific data element position and is either a data element or a '0'. In this example, each 3:1 mux output is a byte wide and the resultant is a data block composed of sixteen packed bytes of data.

Figure 7:
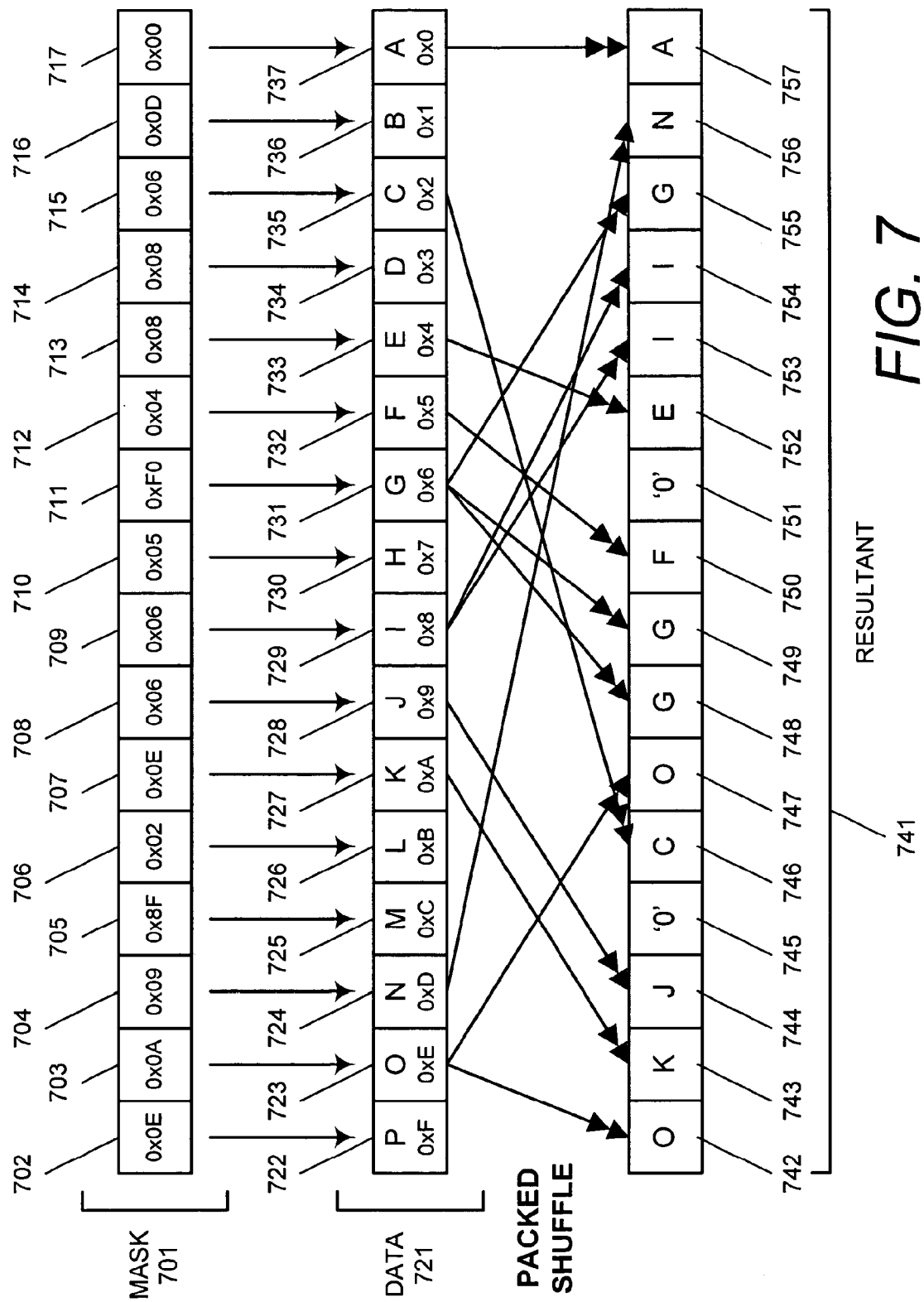
FIG. 7 illustrates the operation of a data shuffle on byte wide data elements in accordance with one embodiment of the present invention.

FIG. 7 illustrates the operation of a data shuffle on byte wide data elements in accordance with one embodiment of the present invention. This is an example of the instruction "PSHUFB DATA, MASK". Note that the most significant bit of shuffle masks for byte positions 0x6 and 0xC of MASK 701 are set so the result in resultant 741 for those positions are zero. In this example, source data is organized into a destination data storage device 721, which in one embodiment is also the source data storage device 721, in view of a set of masks 701 that specify the address wherein respective data elements from the source operand 721 are to be stored in the destination register 741. The two source operands, mask 701 and data 721, each comprise of sixteen packed data elements in this example, as does the resultant 741. In this embodiment, each of the data elements involved is a eight bits or a byte wide. Thus mask 701, data 721, and resultant 741 data blocks are each 128 bits long. Furthermore, these data blocks can reside in memory or registers. For one embodiment, the arrangement of the masks is based on the desired data processing operation, which may include for example, a filtering operation or a convolution operation.

As shown in FIG. 7, mask operand 701 includes data elements with shuffle masks of: 0x0E 702, 0x0A 703, 0x09 704, 0x8F 705, 0x02 706, 0x0E 707, 0x06 708, 0x06 709, 0x05 710, 0xF0 711, 0x04 712, 0x08 713, 0x08 714, 0x06 715, 0x0D 716, 0x00 717. Similarly, data operand 721 includes source data elements of: P 722, O 723, N 724, M 725, L 726, K 727, J 728, I 729, H 730, G 731, F 732, E 733, D 734, C 735, B 736, A 737. In the representations of data segments of FIG. 7, the data element position is also noted under the data as a hex value. Accordingly, a packed shuffle operation is performed with the mask 701 and data 721. Using the set of shuffle masks 701, processing of the data 721 can be performed in parallel.

As each of the data element shuffle masks are evaluated, the appropriate data from the designated data element or a '0' is shuffled to the corresponding data element position for that particular shuffle mask. For instance, the right most shuffle mask 717 has a value 0x00, which is decoded to designate data from position 0x0 of the source data operand. In response, data A from data position 0x0 is copied to the right most position of the resultant 741. Similarly, the second shuffle mask 716 from the right has a value of 0x0D, which is decoded to be 0xD. Thus data N from data position 0xD is copied to the second position from the right in the resultant 741.

The fourth data element position from the left in the resultant 741 is a '0'. This is attributed to the value of 0x8F in the shuffle mask for that data element position. In this embodiment, bit 7 of the shuffle mask byte is a 'set to zero' or 'flush to zero' indicator. If this field is set, the corresponding data element position in the resultant is filled with a '0' value instead of data from the source data operand 721. Similarly, the seventh position from the right in the resultant 741 has a value of '0'. This is due to the shuffle mask value of 0xF0 for that data element position in the mask 701. Note that not all bits in the shuffle mask may be used in certain embodiments. In this embodiment, the lower nibble, or four bits, of a shuffle mask is sufficient to select any of the sixteen possible data elements in the source data operand 721. As bit 7 is the 'set to zero' field, three other bits remain unused and can be reserved or ignored in certain embodiments. For this embodiment, the 'set to zero' field controls and overrides the data element selection as indicated in the lower nibble of the shuffle mask. In both of these instances, the fourth data element position from the left and the seventh position from the right, a shuffle mask value of 0x80 wherein the 'flush to zero' flag is set at bit seven can also cause the corresponding resultant data element position to be filled with a '0'.

As shown in FIG. 7, the arrows illustrate the shuffling of the data elements per the shuffle masks in mask 701. Depending on the particular set of shuffle masks, one or more of the source data elements may not appear in the resultant 741. In some instances, one or more '0's can also appear at various data element positions in the resultant 741. If the shuffle masks are configured to broadcast one or a particular group of data elements, the data for those data elements may be repeated as a chosen pattern in the resultant. Embodiments of the present invention are not restricted to any particular arrangements or shuffle patterns.

As noted above, the source data register is also utilized as the destination data storage register in this embodiment, thereby reducing the number of registers needed. Although the source data 721 is thus overridden, the set of shuffle masks 701 is not altered and is available for future reference. Overwritten data within the source data storage device can be reloaded from memory or another register. In another embodiment, multiple registers can be used as the source data storage device, with their respective data organized within the destination data storage device as desired.

Figure 8:
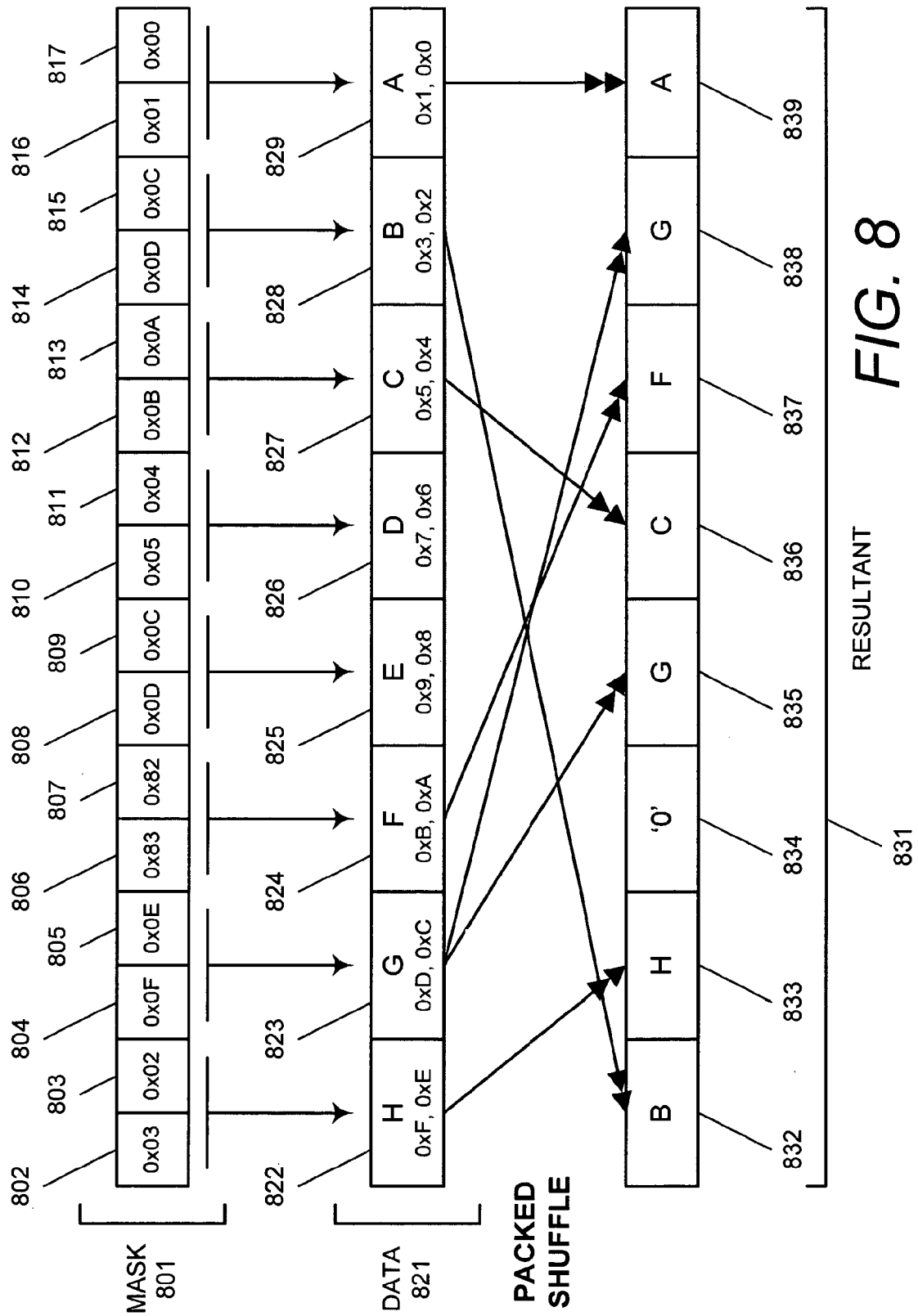
FIG. 8 illustrates the operation of a data shuffle operation on word wide data elements in accordance with another embodiment of the present invention.

FIG. 8 illustrates the operation of a data shuffle operation on word wide data elements in accordance with another embodiment of the present invention. The general discussion of this example is somewhat similar to that of FIG. 7. In this scenario, however, the data elements of the data operand 821 and resultant 831 are word length. For this embodiment, the data element words are handled as pairs of data elements as the shuffle masks in the mask operand 801 are byte size. Thus a pair of shuffle mask bytes are used to define each data element word position. But for another embodiment, the shuffle masks can also have word granularity and describe word sized data element positions in the resultant.

The mask operand 801 of this example includes byte wide data elements with shuffle masks of: 0x03 802, 0x02 803, 0x0F 804, 0x0E 805, 0x83 806, 0x82 807, 0x0D 808, 0x0C 809, 0x05 810, 0x04 811, 0x0B 812, 0x0A 813, 0x0D 814, 0x0C 815, 0x01 816, 0x00 817. The data operand 821 includes source data elements of: H 822, G 823, F 824, E 835, D 836, C 827, B 828, A 829. In the representations of data segments of FIG. 8, the data element position is also noted under the data as a hex value. As shown in FIG. 8, each of the word size data elements in the data operand 821 have data position addresses it occupies two byte size positions. For example, data H 822 takes up byte size data element positions 0xF and 0xE.

A packed shuffle operation is performed with the mask 801 and data 821. The arrows in FIG. 8 illustrate the shuffling of the data elements per the shuffle masks in mask 801. As each of the data element shuffle masks are evaluated, the appropriate data from the designated data element position of the data operand 821 or a '0' is shuffled to the corresponding data element position in the resultant 831 for that particular shuffle mask. In this embodiment, the byte size shuffle masks operate in pairs in order to designate word size data elements. For example, the two leftmost shuffle masks 0x03 802, 0x02 803, in the mask operand 801 together correspond to the leftmost word wide data element position 832 of the resultant 831. During the shuffle operation, the two data bytes, or single data word, at data element byte positions 0x03 and 0x02, which in this case is data B 828, is arranged into the two leftmost byte size data element positions 832 in the resultant 831.

Furthermore, the shuffle masks can also be configured to force a word size data element to '0' in the resultant as shown with shuffle masks 0x83 806 and 0x82 807 for the third word size data element position 834 in the resultant 831. Shuffle masks 0x83 806 and 0x82 807 have their 'set to zero' fields set. Although two shuffle mask bytes are paired together here, different pairings can also be implemented to arrange four bytes together as a quadword or eight bytes together to form a double quadword, for example. Similarly, the pairings are not restricted to consecutive shuffle masks or particular bytes. In another embodiment, word size shuffle masks can be used to designate word size data elements.

FIG. 9 is a flow chart 900 illustrating one embodiment of a method to shuffle data. The length value of L is generally used here to represent the width of the operands and data blocks. Depending on the particular embodiment, L can be used to designate the width in terms of number of data segments, bits, bytes, words, etc. At block 910, a first length L packed data operand is received for use with a shuffle operation. A length L set of M length shuffle masks designating a shuffle pattern is received at block 920. In this example, L is 128 bits and M is 8 bits or a byte. In another embodiment, L and M can also be other values, such as 256 and 16, respectively. At block 930, the shuffle operation is performed wherein data elements from the data operand are shuffled arranged into a resultant in accordance to the shuffle pattern.

The details of the shuffle at block 930 of this embodiment is further described in terms of what occurs for each data element position. For one embodiment, the shuffling for all of the packed resultant data element positions are processed in parallel. In another embodiment, a certain portion of the masks may be processed together at a time. At block 932, a check is made to determine whether a zero flag is set. This zero flag refers to the set/flush to zero field of each shuffle mask. If the zero flag is determined as set at block 932, the entry at the resultant data element position corresponding to that particular shuffle mask is set to '0'. If the zero flag is found not set at block 932, the data from the source data element designated by the shuffle mask is arranged into the destination data element position of the resultant corresponding to that shuffle mask.

Currently, table lookups using integer instructions requires a large number of instructions. An even greater number of instructions are needed per lookup if integer operations are used to access data for algorithms implemented with SIMD instructions. But by using embodiments of a packed byte shuffle instruction, the instruction count and execution time is drastically reduced. For instance, sixteen data bytes can be accessed during a table lookup with a single instruction if the table size is sixteen bytes or less. Eleven SIMD instructions can be used to lookup table data if the table size is between seventeen and thirty two bytes. Twenty three SIMD instructions are needed if the table size is between thirty three and sixty four bytes.

There are some applications with data parallelism that cannot be implemented with SIMD instructions due to their use of lookup tables. The quantization and deblocking algorithms of the video compression method H.26L is an example of an algorithm that uses small lookup tables that may not fit into a 128 bit register. In some cases, the lookup tables used by these algorithms are small. If the table can fit in a single register, the table lookup operation can be accomplished with one packed shuffle instruction. But if the memory space requirement of the table exceeds the size of a single register, embodiments of a packed shuffle instruction can still work via a different algorithm. One embodiment of a method for handling oversized tables divides a table into sections, each equal to the capacity of a register, and accesses each of these table sections with a shuffle instruction. The shuffle instruction uses the same shuffle control sequence to access each section of the table. As a result, a parallel table lookup can be implemented in these cases with the packed byte shuffle instruction, thus permitting the use of SIMD instructions to improve algorithm performance. Embodiments of the present invention can help improve performance and reduce the number of memory accesses needed for algorithms that use small lookup tables. Other embodiments also permit access of multiple lookup table elements using SIMD instructions. A packed byte shuffle instruction in accordance to the present invention permits efficient SIMD instruction implementation instead of less efficient integer implantation of algorithms that use small lookup tables. This embodiment of the present invention demonstrates how to access data from a table that requires memory space larger than a single register. In this example, the registers contain different segments of the table.

FIGS. 10A-H illustrate the operation of a parallel table lookup algorithm using SIMD instructions. The example described in FIGS. 10A-H involves the lookup of data from multiple tables and wherein certain selected data elements as specified in a set of masks are shuffled from these multiple tables into a merged block of resultant data. The discussion below is explained in the context of packed operations, especially a packed shuffle instruction as disclosed in the earlier above text. The shuffle operation of this example overwrites the source table data in the register. If the table is to be reused following the lookup operation, the table data should be copied to another register before the operation is executed so that another load is not needed. In an alternative embodiment, the shuffle operation makes use of three separate registers or memory locations: two source and one destination. The destination in an alternative embodiment is a register or memory location that is different from either of the source operands. Thus, the source table data is not overridden and can be reused. In this example, the table data is treated as coming from different portions of a larger table. For example, LOW TABLE DATA 1021 is from a lower address region of the table and HIGH TABLE DATA 1051 is from a higher address region of the table. Embodiments of the present invention are not restrictive as to where the table data can originates. The data blocks 1021, 1051, can be adjacent, far apart, or even overlapping. Similarly, table data can also be from different data tables or different memory sources. It is also envisioned that such a table lookup and data merging can be performed on data from multiple tables. For instance, instead of coming from different parts of the same table, LOW TABLE DATA 1021 can be from a first table and HIGH TABLE DATA 1051 can be from a second table.

Figure 10A:
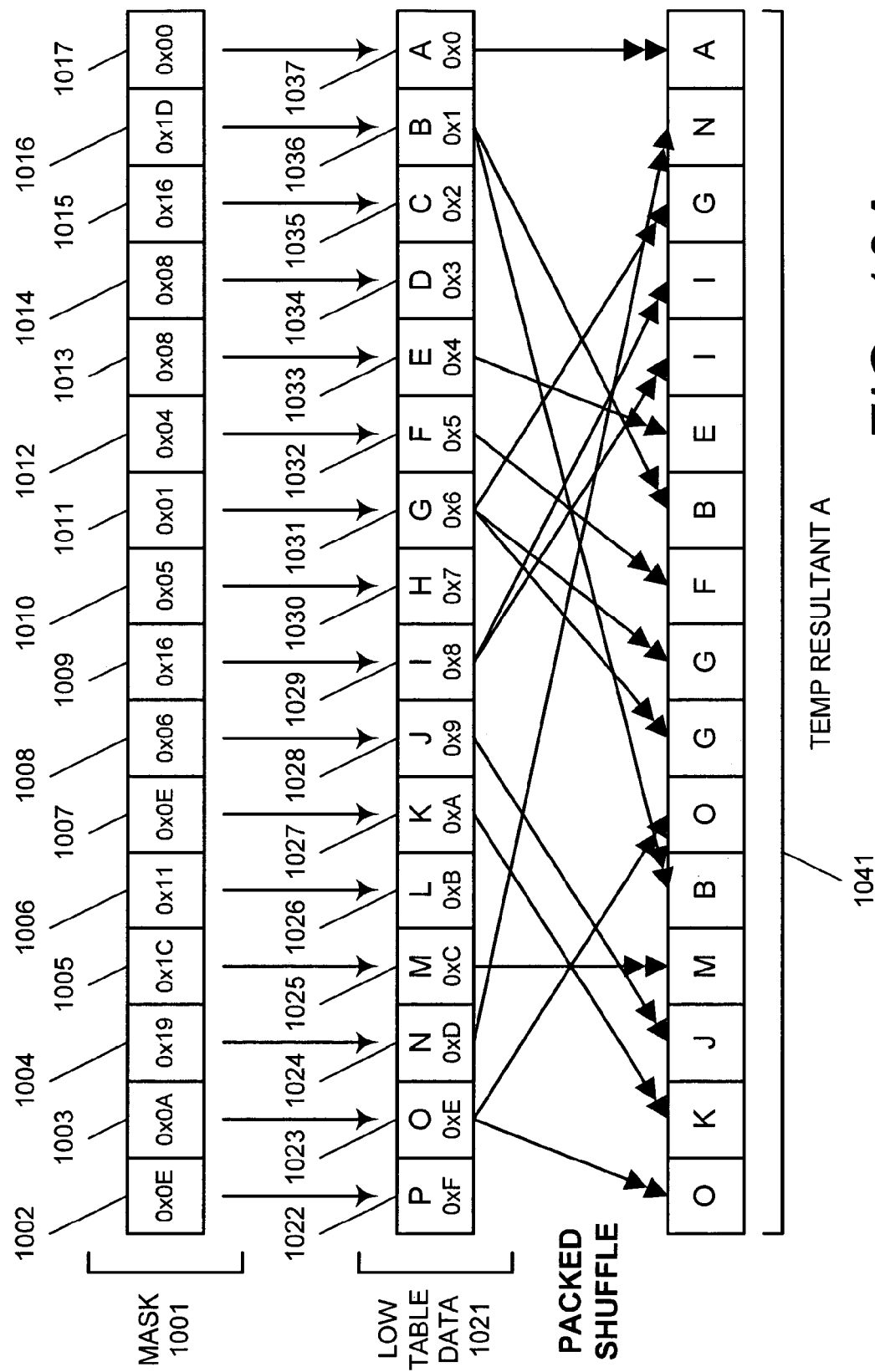

FIG. 10A illustrates a packed data shuffle of a first set of data elements from a table based on a set of shuffle masks. This first set of data elements is grouped as an operand named LOW TABLE DATA 1021. MASK 1001 and LOW TABLE DATA 1021 are each comprised of sixteen elements in this example. A shuffle operation of MASK 1001 and LOW TABLE DATA 1021 yields a resultant TEMP RESULTANT A 1041. The lower portion of a shuffle control mask selects the data element in the register. The number of bits needed to select a data element is the number of register data elements in $\log_2$. For example, if the register capacity is 128 bits and the data type is bytes, the number of register data elements is sixteen. In this case, four bits are need to select a data element. FIG. 10B illustrates a packed data shuffle of a second set of data elements from a table based on the same set of shuffle masks of FIG. 10A. This second set of data elements is grouped as an operand named HIGH TABLE DATA 1051. HIGH TABLE DATA 1051 is also comprised of sixteen elements in this example. A shuffle operation of MASK 1001 and HIGH TABLE DATA 1051 yields a resultant TEMP RESULTANT B 1042.

Figure 10C:
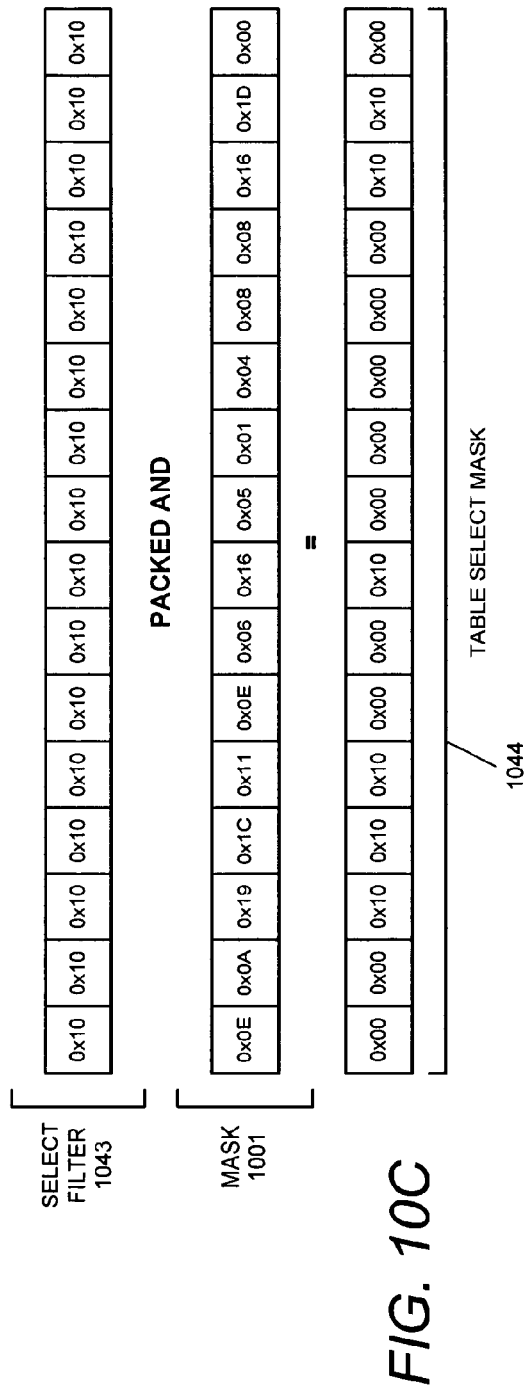

Because the same set of masks 1001 were used with both the LOW TABLE DATA 1021 and HIGH TABLE DATA 1051, their respective resultants 1041, 1042, appear to have similarly positioned data, but from different source data. For example, the leftmost data position of both resultants 1041, 1042, have data from data element 0xE 1023, 1053, of its respective data source 1021, 1051. FIG. 10C illustrates a logical packed AND operation involving SELECT FILTER 1043 and the set of shuffle masks MASK 1001. SELECT FILTER in this case is a filter to distinguish which of the shuffle masks in MASK 1001 are related to the first table data 1021 and which to the second table data 1051. The shuffle masks of this embodiment utilize the source select field, SRC SELECT 336, as discussed previously in FIG. 3C. Lower bits of a shuffle control byte are used to select a data element position in a register and the upper bits, excluding the most significant bit, are used to select the segment of the table. For this embodiment, the bits immediately above and adjacent to those used to select the data select the section of the table. SELECT FILTER 1043 applies 0x10 to all the shuffle masks in MASK 1001 separate out the source select field from the shuffle masks. The packed AND operation yields a TABLE SELECT MASK 1044 that to indicate which data element position in the end resultant should be from the first data set 1021 or the second data set 1051.

The number of bits to select the table section is equal to the number of table sections in $\log_2$. For example, in the case of table sizes ranging from seventeen to thirty two bytes with sixteen byte registers, the lowest four bits select the data and the fifth bit selects the table section. Here, source select uses the lowest bit of the second nibble, bit 4, of each shuffle mask to designate the data source as there are two data sources 1021, 1051. The section of the table with indices between zero and fifteen is accessed with the packed shuffle instruction in FIG. 10A. The section of the table with indices between sixteen and thirty one is accessed with the packed shuffle instruction in FIG. 10B. The field that selects the section of the table is isolated from the shuffle control bytes/indices in FIG. 10C. In implementations with a larger number of data sources, additional bits may be needed the source select fields. In the case of a thirty two byte table, the shuffle control bytes 0x00 to 0x0F would select table elements zero through fifteen in the first table section and shuffle control bytes 0x10 to 0x1F would select table elements sixteen through thirty one in the second table section. For instance, consider a shuffle control byte specifies 0x19. The bit representation of 0x19 is 0001 1001. The lower four bits, 1001, select the ninth byte (counting from 0) and the fifth bit, which is set to 1, selects the second table of two tables. A fifth bit equal to 0 would select the first table.

Figure 10D:
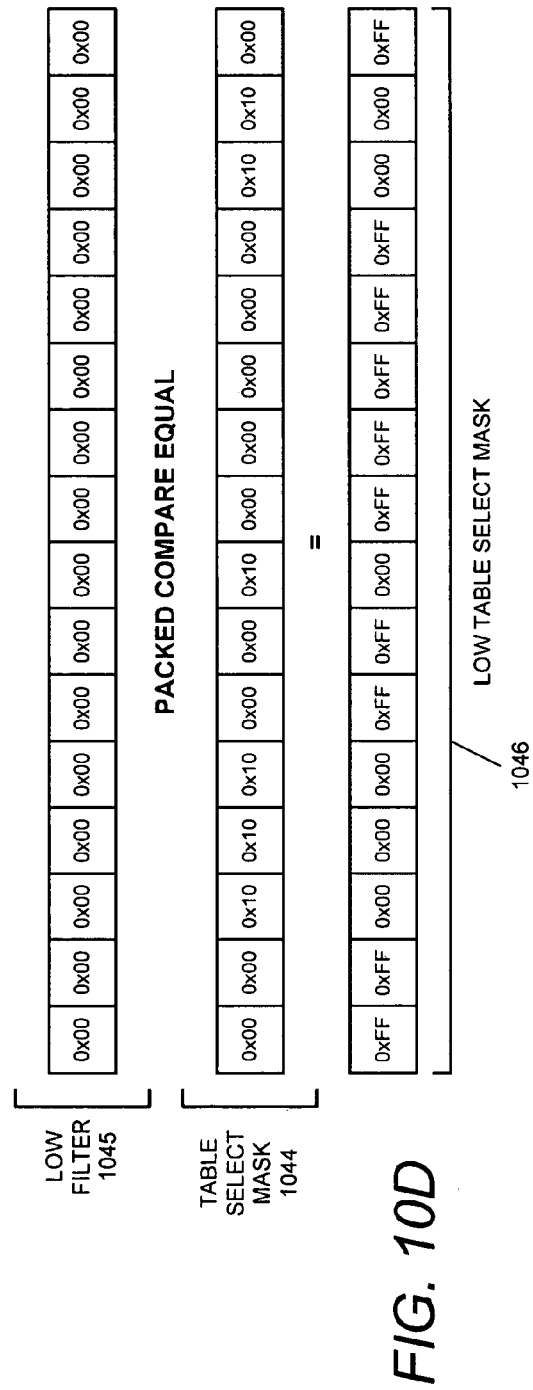

A mask to selects data values accessed from the first table section with indices zero to fifteen is computed with a packed compare equal operation for this embodiment in FIG. 10D by selecting the shuffle control bytes whose fifth bit is a zero. FIG. 10D illustrates a packed "compare equal operation" of LOW FILTER 1045 and TABLE SELECT MASK 1044. The low table select mask produced in FIG. 10D for the first table section selects data elements accessed from the first table section with another packed shuffle operation. LOW FILTER 1045 in this instance is a mask to pull out or highlight the data element positions indicated by the shuffle masks as coming from the first data set 1021. If the source select field is '0' in this embodiment, then the data source is to be LOW TABLE DATA 1021. The compare equal operation yields a LOW TABLE SELECT MASK 1046 with 0xFF values for the data element positions that have a source select value of '0'.

Figures 10E, 10F:
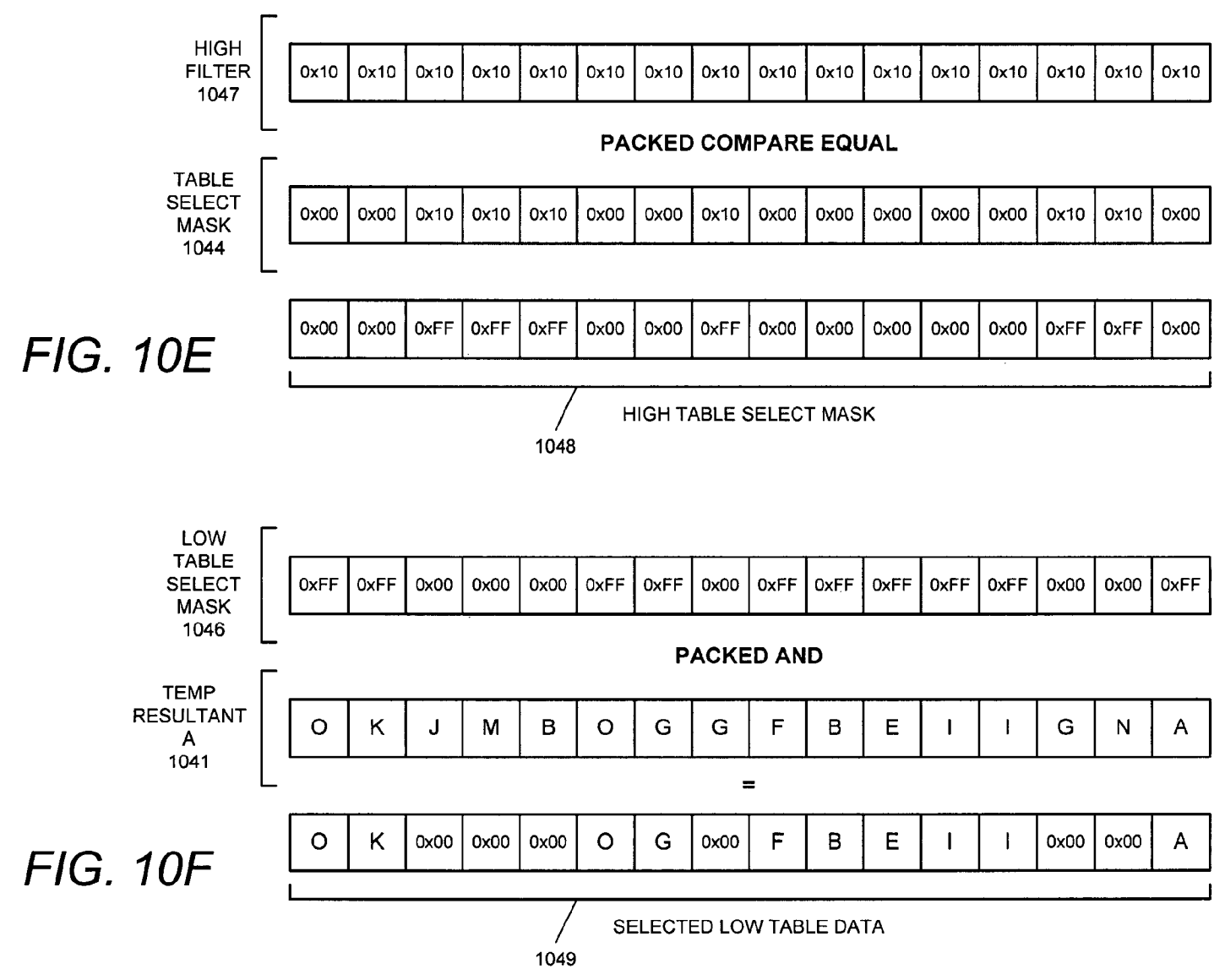

A mask to selects data values accessed from the second table section with indices sixteen to thirty one is computed with a packed compare equal operation in FIG. 10E by selecting the shuffle control bytes whose fifth bit is a one. FIG. 10E illustrates a similar compare equal operation on HIGH FILTER 1047 and TABLE SELECT MASK 1044. The high table select mask produced in FIG. 10E for the second table section selects data elements accessed from the second table section with a packed shuffle operation. HIGH FILTER 1047 is a mask to pull out the data element position indicated by the source select fields of the shuffle mask as coming from the second data set 1051. If the source select field is '1' in this embodiment, then the data source is to be HIGH TABLE DATA 1051. The compare equal operation yields a HIGH TABLE SELECT MASK 1048 with 0xFF values for the data element position that have a source select value of '1'.

The data elements selected from the two table sections are merged at FIG. 10F. At FIG. 10F, a packed AND operation on LOW TABLE SELECT MASK 1046 and TEMP RESULTANT A 1041 is shown. This packed AND operation filters out the selected shuffled data elements from the first data set 1021 per the mask 1046 that is based on the source select fields. For example, the source select field in the shuffle mask 1002 for the leftmost data element position has a value of '0' as shown in TABLE SELECT MASK 1044. Accordingly, LOW TABLE SELECT MASK 1046 has a 0xFF value in that position. The and operation here in FIG. 10F between that 0xFF and the data in the leftmost data element position causes the data O to transfer to SELECTED LOW TABLE DATA 1049. On the other hand, the source select field in the shuffle mask 1004 for the third data element position from the left has a value of '1' to indicate that the data is to come from a source other than the first data set 1021. Accordingly, LOW TABLE SELECT MASK 1046 has a 0x00 value in that position. The and operation here does not pass the data J to SELECTED LOW TABLE DATA 1049 and that position is left empty as 0x00.

A similar packed AND operation on HIGH TABLE SELECT MASK 1048 and TEMP RESULTANT B 1042 is shown in FIG. 10G. This packed AND operation filters out the selected shuffled data elements from the second data set 1051 per the mask 1048. Unlike the packed AND operation described in FIG. 10F, the mask 1048 allows data designated by the source select fields as coming from the second set of data to pass to SELECTED HIGH TABLE DATA 1050 while the other data element positions are left empty.

FIG. 10H illustrates the merging of the selected data from the first data set and the second data set. A packed logical OR operation is performed on SELECTED LOW TABLE DATA 1049 and SELECTED HIGH TABLE DATA 1050 to obtain MERGED SELECTED TABLE DATA 1070, which is the desired resultant of the parallel table lookup algorithm in this example. In an alternative embodiment, a packed addition operation to add together SELECTED LOW TABLE DATA 1049 and SELECTED HIGH TABLE DATA 1050 can also yield MERGED SELECTED TABLE DATA 1070. As shown in FIG. 10H, either SELECTED LOW TABLE DATA 1049 or SELECTED HIGH TABLE DATA 1050 has a 0x00 value for a given data position in this embodiment. This is because the other operand that does not have the 0x00 value is to contain the desired table data selected from the appropriate source. Here, the leftmost data element position in the resultant 1070 is 0, which is shuffled data 1041 from the first data set 1021. Similarly, the third data element position from the left in the resultant 1070 is Z, which is shuffled data 1042 from the second data set 1051.

The method for looking up data in oversized tables in this example embodiment can be summarized generally with the following operations. First, copy or load the table data into registers. Table values from each table section are accessed with a packed shuffle operation. The source select fields that identify the table section are extracted from the shuffle masks. Compare-if-equal operations on the source select fields with the table section number to determine which table sections are the appropriate sources for the shuffled data elements. The compare-if-equal operations provides masks to further filter out the desired shuffled data elements for each table section. The desired data elements from the appropriate table sections are merged together to form the end table lookup resultant.

Figure 11:
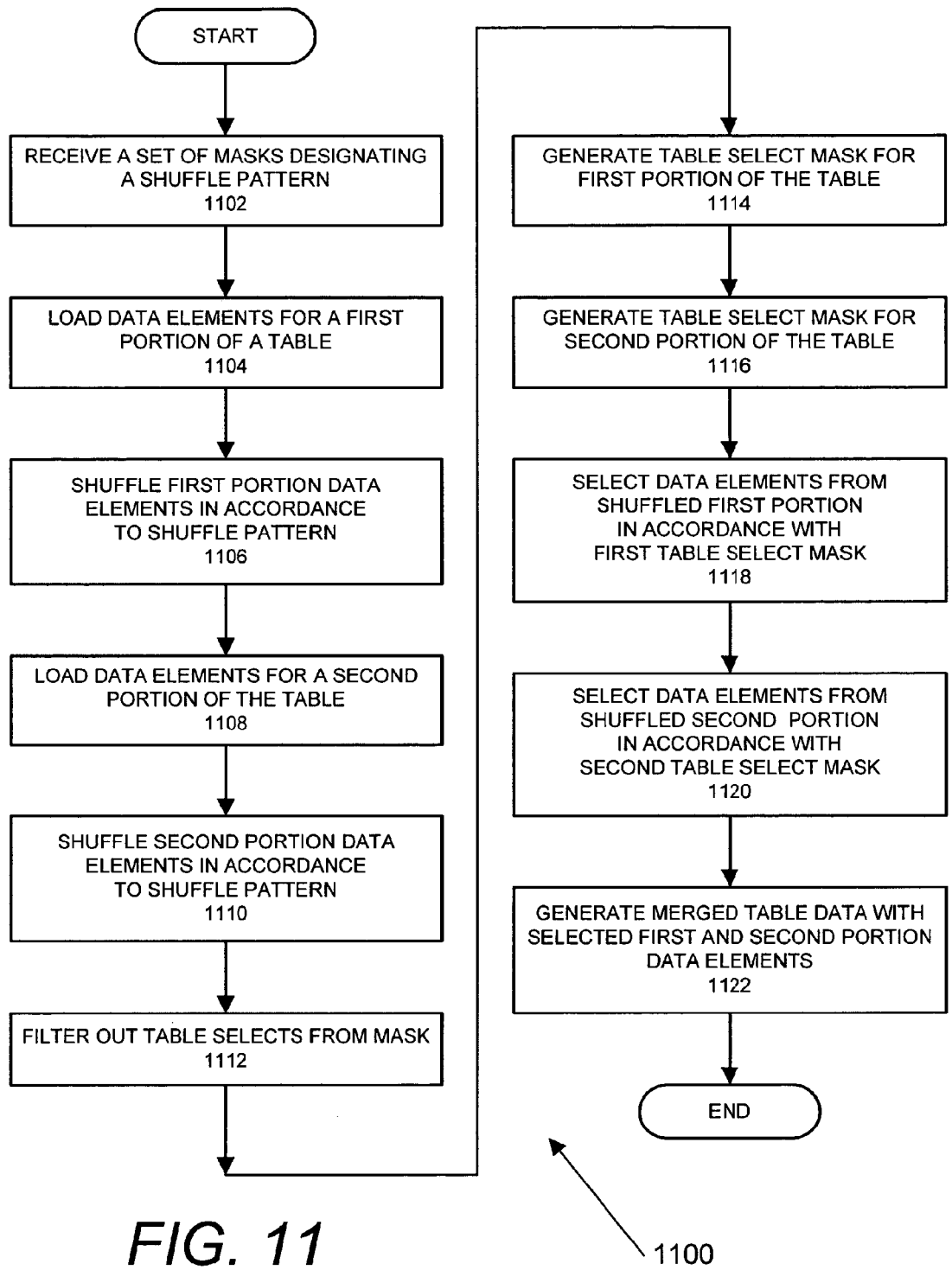
FIG. 11 is a flow chart illustrating one embodiment of a method to perform a table lookup using SIMD instructions.

FIG. 11 is a flow chart illustrating one embodiment of a method to perform a table lookup using SIMD instructions. The flow described here generally follows the methodology of FIG. 10A-H, but is not restricted as such. Some of these operations can also be performed in different order or using various types of SIMD instructions. At block 1102, a set of shuffle masks designating a shuffle pattern is received. These shuffle masks also include source fields to indicate from which table or source to shuffle data elements to obtain the desired resultant. At block 1104, the data elements for a first portion of a table or a first data set is loaded. The first portion data elements are shuffled in accordance to the shuffle pattern of block 1102 at block 1106. Data elements for a second portion of a table or a second data set is loaded at block 1108. The second portion data elements are shuffled in accordance to the shuffle pattern of block 1102 at block 1110. At block 1112, table selects are filtered out from the shuffle masks. The table selects of this embodiment involve the source select fields that designate where a data element is supposed to originate from. At block 1114, a table select mask is generated for the shuffled data from the first portion of the table. A table select mask is generated for the shuffled data from the second portion of the table at block 1116. These table select masks are to filter out the desired shuffled data elements for specific data element positions from the appropriate table data source.

At block 1118, data elements are selected from the shuffled data of the first table portion in accordance with a table select mask of block 1114 for the first table portion. Data elements are selected at block 1120 from the shuffled data of the second table portion in accordance with the table select mask of block 1116 for the second table portion. The shuffled data elements selected from the first table portion at block 1118 and from the second table portion at block 1120 are merged together at block 1122 to obtain merged table data. The merged table data of one embodiment includes data elements shuffled from both the first table data and the second table data. For another embodiment, the merged table data can include data looked up from more than two table sources or memory regions.

Figure 12:
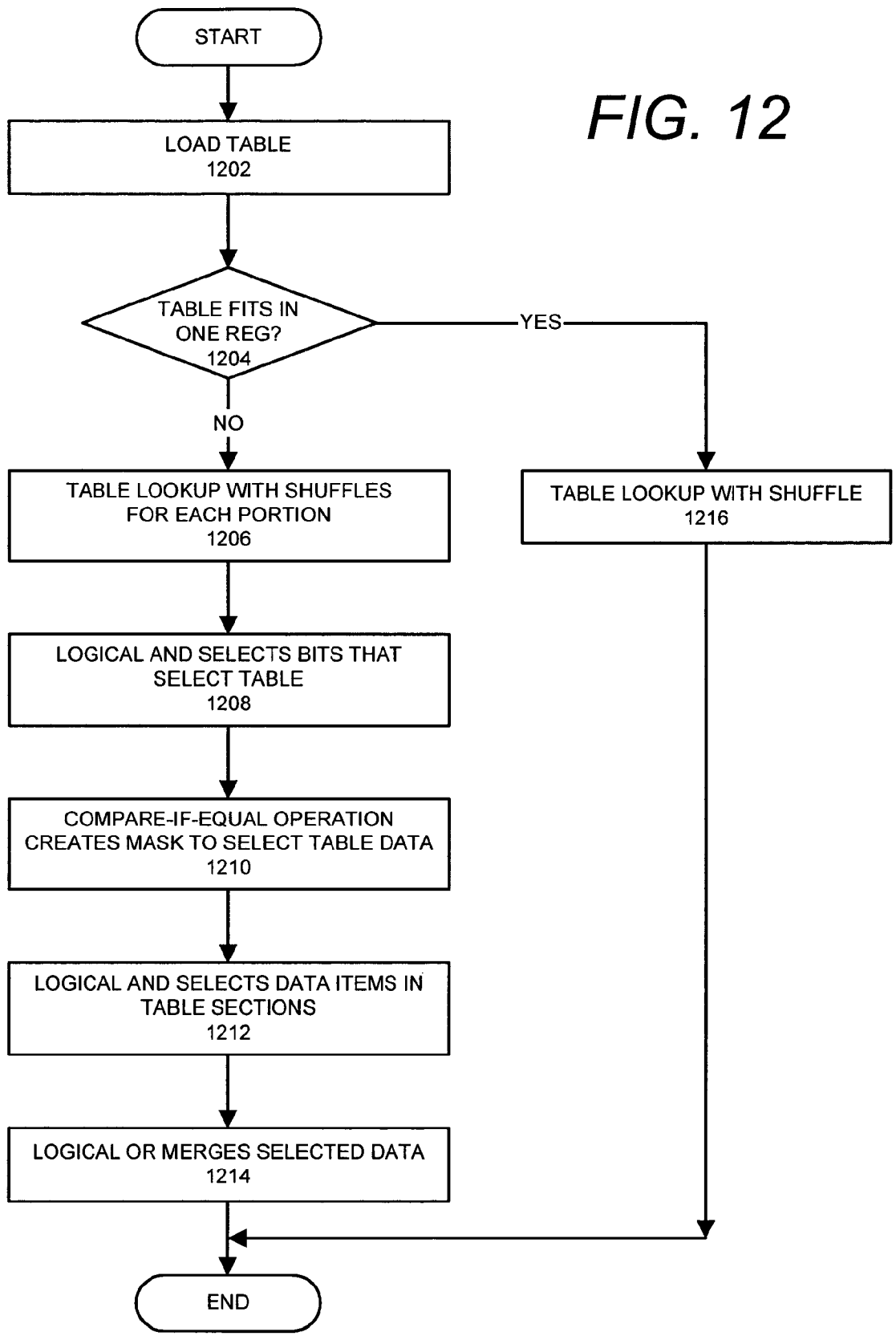
FIG. 12 is a flow chart illustrating another embodiment of a method to perform a table lookup.

FIG. 12 is a flow chart illustrating another embodiment of a method to perform a table lookup. At block 1202, a table having a plurality of data elements are loaded. A determination is made at block 1204 as to whether the table fits in a single register. If the table fits into a single register, the table lookup is performed with a shuffle operation at block 1216. If the data does not fit into a single register, table lookup is to be performed with shuffle operations for each relevant portion of the table at block 1206. A logical packed AND operation is performed to obtain the bits or field that select the table portion or data source. A "compare-if-equal" operation at block 1210 creates a mask to select table data from the relevant portions of the table to be looked up. At block 1212, a logical AND operation is used to look up and select data items from the table sections. A logical OR operation merges the selected data at block 1214 to obtain the desired table lookup data.

One embodiment of the packed shuffle instruction is implemented into an algorithm for rearranging data between multiple registers using the flush to zero capability. The objective of a mix operation is to merge the contents of two or more SIMD registers in a single SIMD register in a selected arrangement in which the positions of data in the resultant differ from their original position in the source operands. Selected data elements are first moved to desired result positions and unselected data elements are set to zero. The positions to which selected data elements were moved for one register are set to zero in other registers. Consequently, a single one of the result registers may contain a nonzero data item in a given data element position. The following general instruction sequence can be used to mix data from two operands:

packed byte shuffle DATA A, MASK A;
packed byte shuffle DATA B, MASK B;
packed logical OR RESULTANT A, RESULTANT B.

Figure 13A:
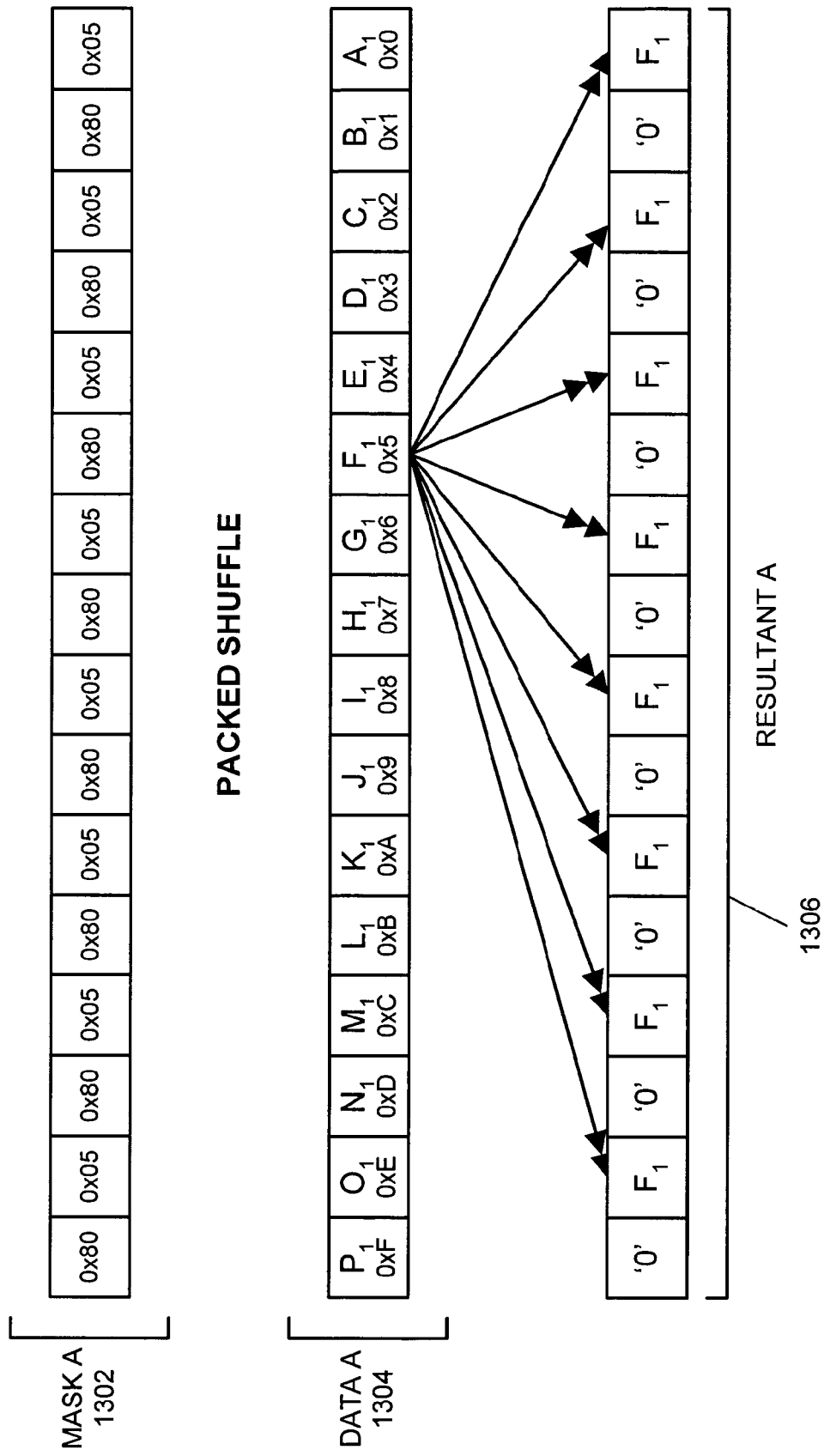
Figure 13B:
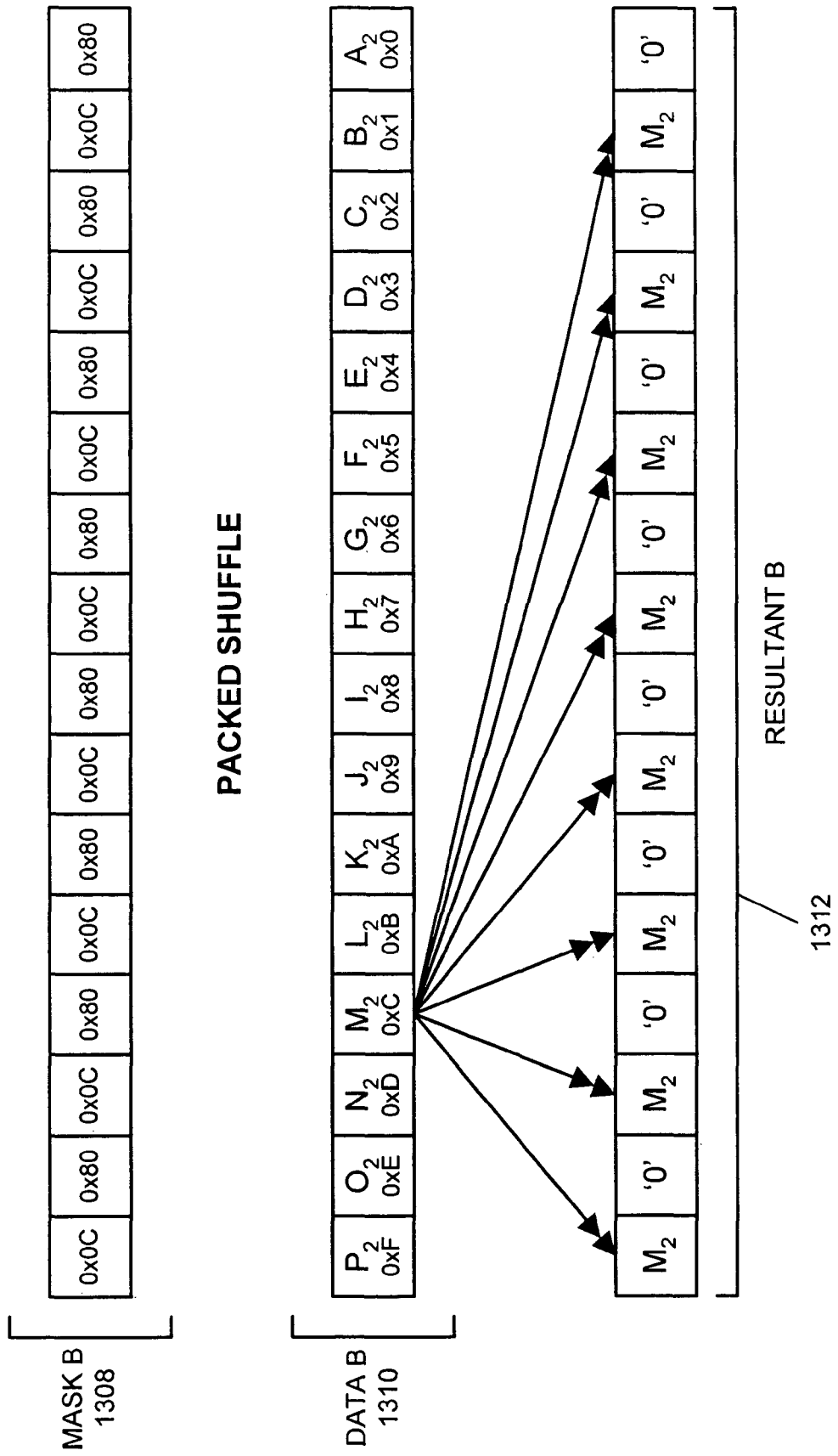
Figure 13C:
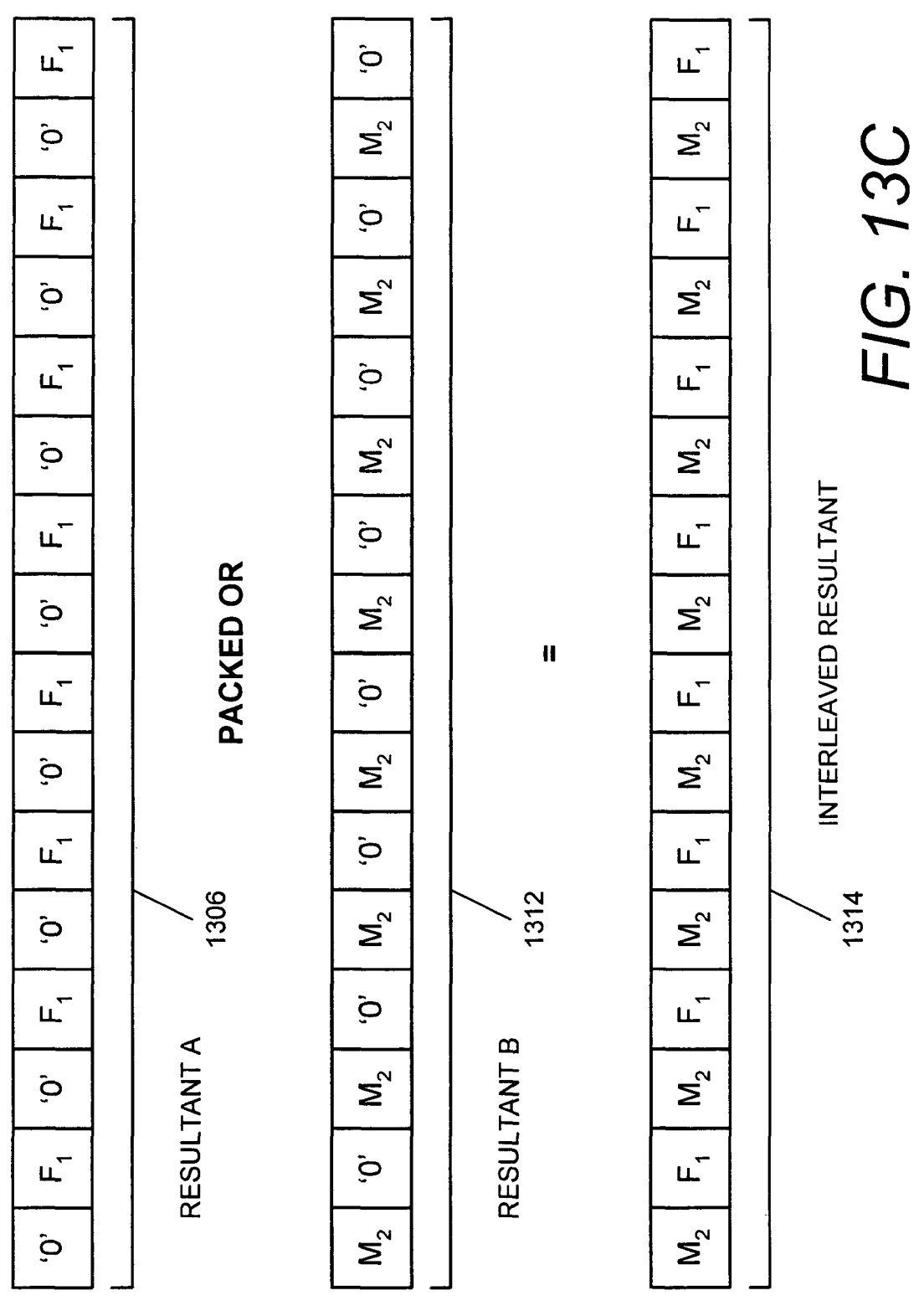

Operands DATA A and DATA B contain elements that are to be rearranged or set zero. Operands MASK A and MASK B contain shuffle control bytes that specify where data elements are to be moved and which data elements are to be set to zero. For this embodiment, data elements in destination positions not set to zero by MASK A are set to zero by MASK B and destination positions not set to zero by MASK B are set to zero by MASK A. FIGS. 13A-C illustrates an algorithm for rearranging data between multiple registers. In this example, data elements from two data sources or registers 1304, 1310, are shuffled together into an interleaved data block 1314. The data blocks including masks 1302, 1308, source data 1304, 1310, and resultants 1306, 1312, 1314, of this example are each 128 bits long and composed of sixteen byte size data elements. However, alternative embodiments can include data blocks of other lengths having various sized data elements.

FIG. 13A illustrates a first packed data shuffle operation of a first mask, MASK A 1302, on a first source data operand, DATA A 1304. For this example, the desired interleaved resultant 1314 is to include an interleaved pattern of one data element from a first data source 1304 and another data element from a second data source 1310. In this example, the fifth byte of DATA A 1304 is to be interleaved with the twelfth byte of DATA B 1310. MASK A 1302 includes a repeated pattern of "0x80" and "0x05" in this embodiment. The 0x80 value in this embodiment has the set to zero field set, wherein the associated data element position is filled with '0'. The 0x05 value states that the associated data element position for that shuffle mask should be arranged with data $F_1$ from data element 0x5 of DATA A 1304. In essence, the shuffle pattern in MASK A 1302 arranges and repeats data F1 at every other resultant data element position. Here, data F1 is the single piece of data to be shuffled from DATA A 1304. In alternative embodiments, data from various number of source data elements can be shuffled. Thus embodiments are not restricted to patterns involving a single piece of data or any particular pattern. The arrangement combinations for mask patterns are open to all kinds of possibilities. The arrows in FIG. 13A illustrate the shuffling of the data elements per the shuffle masks of MASK A 1302. RESULTANT A 1306 of this shuffle operation is thus comprised of a pattern of '0' and $F_1$ per the mask pattern 1302.

FIG. 13B illustrates a second packed data shuffle operation involving a second mask, MASK B 1308, together with a second source data operand, DATA B 1310. MASK B 1308 includes a repeated pattern of "0x0C" and "0x80". The 0x80 value causes the associated data position for that shuffle mask to receive '0'. The 0xC0 value causes the resultant data element position corresponding to that shuffle mask to be arranged with data $M_2$ from data element 0xC of DATA B 1310. The shuffle pattern of MASK B 1308 arranges data $M_2$ to every other resultant data element position. The arrows in FIG. 13B illustrate the shuffling of the data elements per the set of shuffle masks in MASK B 1308. RESULTANT B 1312 of this shuffle operation is thus comprised of a pattern of '0' and $M_2$ per the mask pattern 1308.

FIG. 13C illustrates the merging of the shuffled data, RESULTANT A 1306 and RESULTANT B 1312 to achieve INTERLEAVED RESULTANT 1314. The merging is accomplished with a packed logical OR operation. The pattern of '0' values in RESULTANT A 1306 and RESULTANT B 1312 allow for the interleaving of the M2 and F1 data values 1314. For example, at the leftmost data element position, the logical OR of '0' and M2 results in M2 in the leftmost data element position of the resultant 1314. Similarly, at the rightmost data element position, the logical OR of $F_1$ and '0' results in $F_1$ in the rightmost data element position of the resultant 1314. Thus data from multiple registers or memory locations can be rearranged into a desired pattern.

Figure 14:
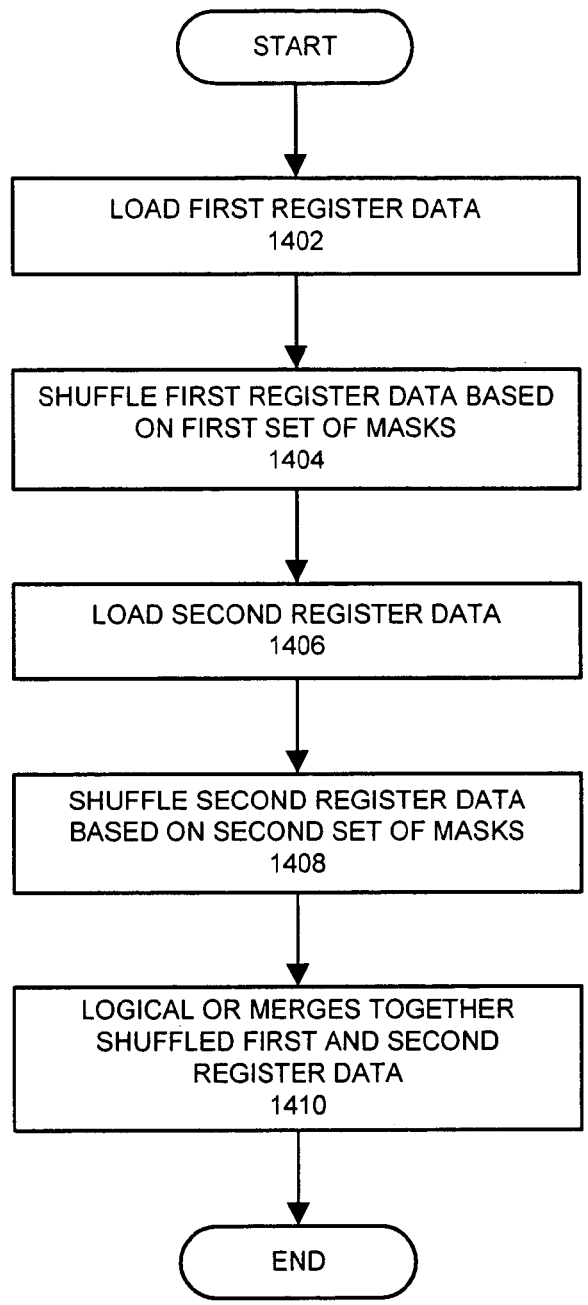
FIG. 14 is a flow chart illustrating one embodiment of a method to rearrange data between multiple registers.

FIG. 14 is a flow chart illustrating one embodiment of a method to rearrange data between multiple registers. Data is loaded from a first register or memory location at block 1402. The first register data is shuffled at block 1404 based on a first set of shuffle masks. At block 1406, data is loaded from a second register or memory location. This second register data is shuffled at block 1408 in accordance with a second set of shuffle masks. The shuffled data from the first and second register shuffles are merged at block 1410 with a logical OR to arrive at an interleaved data block with data from the first and second register.

FIGS. 15A-K illustrates an algorithm for shuffling data between multiple registers to generate interleaved data. This is an example of an application that interleaves planar color data. Image data is often processed in separate color planes and then these planes are later interleaved for display. The algorithm described below demonstrates interleaving for red plane, green plane, and blue plane data as used by image formats such as bitmaps. Numerous color spaces and interleave patterns are possible. As such, this approach can easily be extended to other color spaces and formats. This example implements an often used image processing data format process wherein red (R) plane, green (G) plane, and blue (B) plane data are interleaved into an RGB format. This example demonstrates how the flush to zero capability in accordance to the present invention significantly reduces memory accesses.

Data from three sources are combined together in an interleaved fashion. More particularly, the data relates to pixel color data. For example, color data for each pixel can include information from red (R), green (G), and blue (B) sources. By combining the color information, the red/green/blue (RGB) data can be evaluated to provide the desired color for that particular pixel. Here, the red data is held in operand DATA A 1512, the green data in data operand DATA B 1514, and the blue data in DATA C 1516. This arrangement can exist in an graphics or memory system where data for each separate color is stored together or collected separately as in streaming data. In order to use this information in recreating or displaying the desired image, the pixel data has to be arranged into an RGB pattern wherein all the data for a particular pixel is grouped together.

For this embodiment, a set of masks having predefined patterns are used in interleaving together the RGB data. FIG. 15A illustrates as set of masks: MASK A 1502 having a first pattern, MASK B 1504 having a second pattern, and MASK C 1506 having a third pattern. Data from each register is to be spaced three bytes apart so that it can be interleaved with data from the two other registers. Control bytes with hex values 0x80 have the most significant bit set so that the corresponding byte is flushed to zero by the packed byte shuffle instruction. In each of these masks, every third shuffle mask is enabled to select a data element for shuffling while the two intervening shuffle masks have values of 0x80. The 0x80 value indicates that the set to zero fields in the masks for those corresponding data element positions are set. Thus '0's will be placed in the data element positions associated with that mask. In this example, the mask patterns are to basically separate out the data elements for each color in order to accomplish the interleaving. For example, when MASK A 1502 is applied to a data operand in a shuffle operation, the MASK A 1502 causes six data elements (0x0, 0x1, 0x2, 0x3, 0x4, 0x5) to be shuffled apart with two data element spaces between each data element. Similarly, MASK B 1504 is to shuffle apart data elements at 0x0, 0x1, 0x2, 0x3, 0x4. MASK C 1506 is to shuffle apart data elements at 0x0, 0x1, 0x2, 0x3, 0x4.

Note that in this implementation, the shuffle mask for each particular overlapping data element position has two set to zero fields set and one shuffle mask designating a data element. For example, referring to the rightmost data element position for the three sets of masks 1502, 1504, 1056, the shuffle mask values are 0x00, 0x80, and 0x80, for MASK A 1502, MASK B 1504, and MASK C 1506, respectively. Thus only the shuffle mask 0x00 for MASK A 1502 will specify data for this position. The masks in this embodiment are patterned so that the shuffled data can be easily merged to form the interleaved RGB data block.

FIG. 15B illustrates the blocks of data to be interleaved: DATA A 1512, DATA B 1514, and DATA C 1516. For this embodiment, each set of data has an data entry with color information for sixteen pixel positions. Here, the subscript notion accompanying each color letter in a data element represents that pixel number. For instance, R0 is the red data for pixel 0 and G15 is the green data for pixel 15. The hex values at each data element illustrated is the number of that data element position. The color data (DATA A 1512, DATA B 1514, DATA C 1516) may be copied into other registers so that the data is not overwritten by the shuffle operation and can be reused without another load operation. In the example of this embodiment, three passes with the three masks 1502, 1504, 1506, are needed to complete the pixel data interleaving. For alternate implementations and other amounts of data, the number of passes and shuffling operations can vary as needed.

FIG. 15C illustrates the resultant data block, MASKED DATA A 1522, for a packed shuffle operation on red pixel data, DATA A 1512, with the first shuffle pattern, MASK A 1502. In response to MASK A 1502, the red pixel data is arranged into every third data element position. Similarly, FIG. 15D illustrates the resultant data block, MASKED DATA B 1524 for a packed shuffle operation on green pixel data, DATA B 1514, with the second shuffle pattern, MASK B 1504. FIG. 15E illustrates the resultant data block, MASKED DATA C 1526 for a shuffle operation on blue pixel data, DATA C 1516, with a third shuffle pattern, MASK C 1506. For the mask patterns of this embodiment, the resultant data blocks from these shuffle operations provide data elements that are staggered so that one of the data elements has data while two have '0's. For instance, the leftmost data element position of these resultants 1522, 1524, 1526, contain $R_5$, '0', and '0', respectively. At the next data element position, the pixel data for another one of the RGB colors is presented. Thus when merged together, a RGB type of grouping is achieved.

In this embodiment, the above shuffled data for the red data and the green data are first merged together with a packed logical OR operation. FIG. 15F illustrates the resultant data, INTERLEAVED A & B DATA 1530, for the packed logical OR-ing of MASKED DATA A 1522 and MASKED DATA B 1524. The shuffled blue data is now merged together with the interleaved red and green data with another packed logical OR operation. FIG. 15G illustrates the new resultant, INTERLEAVED A, B, & C DATA 1532, from the packed logical OR-ing of MASKED DATA C 1526 and MASKED DATA A & B 1530. Thus the resultant data block of FIG. 15G contains the interleaved RGB data for the first five pixels and a portion of the sixth pixel. Subsequent iterations of the algorithm of this embodiment will yield the interleaved RGB data for the rest of the sixteen pixels.

At this point, one third of the data in DATA A 1512, DATA B 1514, and DATA C 1516 has been interleaved. Two approaches can be used to process the remaining data in these registers. Another set of shuffle control bytes can be used to arrange the data to be interleaved or the data in DATA A 1512, DATA B 1514, and DATA C 1516 can be shifted right so that the shuffle masks 1502, 1504, 1506, can be used again. In the implementation shown here, data is shifted to avoid making the memory accesses required to load additional shuffle control bytes. Without these shifting operations, nine sets of control bytes would be needed in this embodiment instead of three (MASK A 1502, MASK B 1504, MASK C 1506). This embodiment can also be applied in architectures where a limited number of registers are available and memory accesses are long.

In alternative embodiments where a large number of registers are available, keeping all or a large number of mask sets in registers so that shift operations are not necessary can be more efficient. Furthermore, in an architecture with many registers and execution units, all of the shuffle operations can be performed in parallel without having to wait for the shifting to occur. For instance, an out-of-order processor with nine shuffle units and nine mask sets can perform nine shuffle operations in parallel. In the embodiment above, the data has to be shifted before the masks are reapplied.

The data elements in the original color data of DATA A 1512, DATA B 1514, and DATA C 1516, are shifted in accordance to the number of data elements already processed for that particular color. In this example, data for six pixels has been processed above for red, so the data elements for red data operand DATA A 1512 is shifted to the right by six data element positions. Similarly, data for five pixels has been processed for both green and blue, so the data elements for green data operand DATA B 1514 and for blue data operand DATA C 1516 are shifted right by five data element positions each. The shifted source data is illustrated as DATA A' 1546, DATA B' 1542, and DATA C' 1544, for the colors red, green, and blue, respectively, in FIG. 15H.

Figures 15J, 15K:
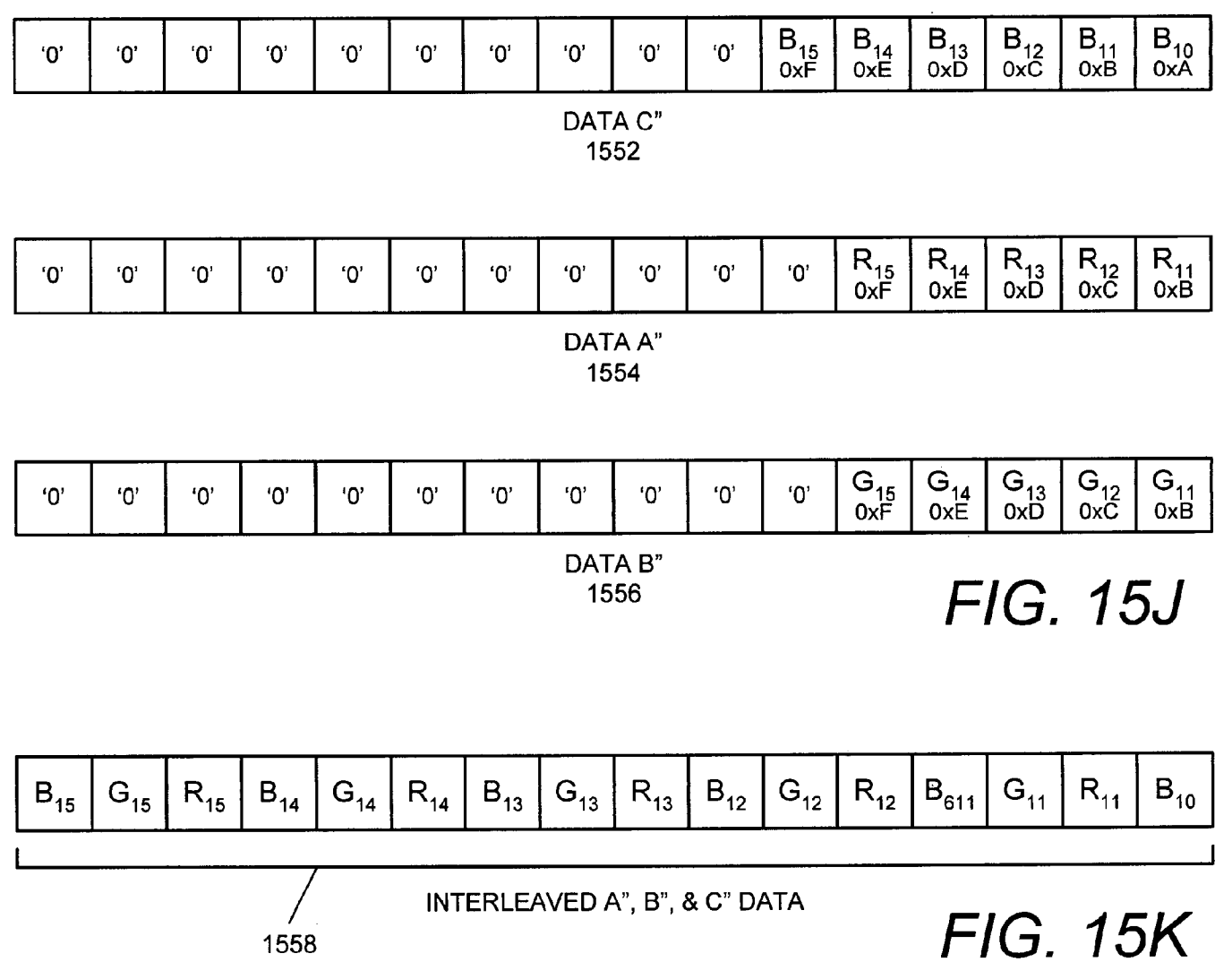

The shuffle and logical OR operations as discussed above with FIG. 15A-G are repeated with this shifted data. Subsequent packed shuffle operations on DATA B' 1542, DATA C' 1544, and DATA A' 1546, together with MASK A 1502, MASK B 1504, and MASK C 1506, respectively, in combination with packed logical OR operations on the three packed shuffle resultants, provides interleaved RGB data for another four pixels and parts of another two. This resultant data, INTERLEAVED A', B', AND C' DATA 1548 is illustrated in FIG. 15I. Note that the rightmost two data elements relate to the sixth pixel, which already had its red data $R_5$ arranged with the first interleaved data set 1532. The raw pixel color data is shifted again by the appropriate number of places per the processing results of the second pass. Here, data for five additional pixels has been processed for red and blue, so the data elements for red data operand DATA A' 1546 and for blue data operand DATA C' 1544 are shifted to the right by five data element positions. Data for six pixels has been processed for green, so the data elements for green data operand DATA B' 1542 is shifted to the right by six positions. The shifted data for this third pass is illustrated in FIG. 15J. A repeat of the packed shuffle and logical OR operations above are applied to DATA C" 1552, DATA A" 1554, and DATA B" 1556. The resultant interleaved RGB data for the last of the sixteen pixels is illustrated in FIG. 15K as INTERLEAVED A", B" DATA 1558. The rightmost data element with B10 relates to the eleventh pixel, which already has its green data G10 and red data R10 arranged with the second interleaved data set 1548. Thus, by way of a series of packed shuffle with a set of mask patterns and packed logical OR operations, data from multiple sources 1512, 1514, 1516, can be merged and rearranged together in a desired fashion for further use or processing like these resultants 1532, 1548, 1558.

Figure 16:
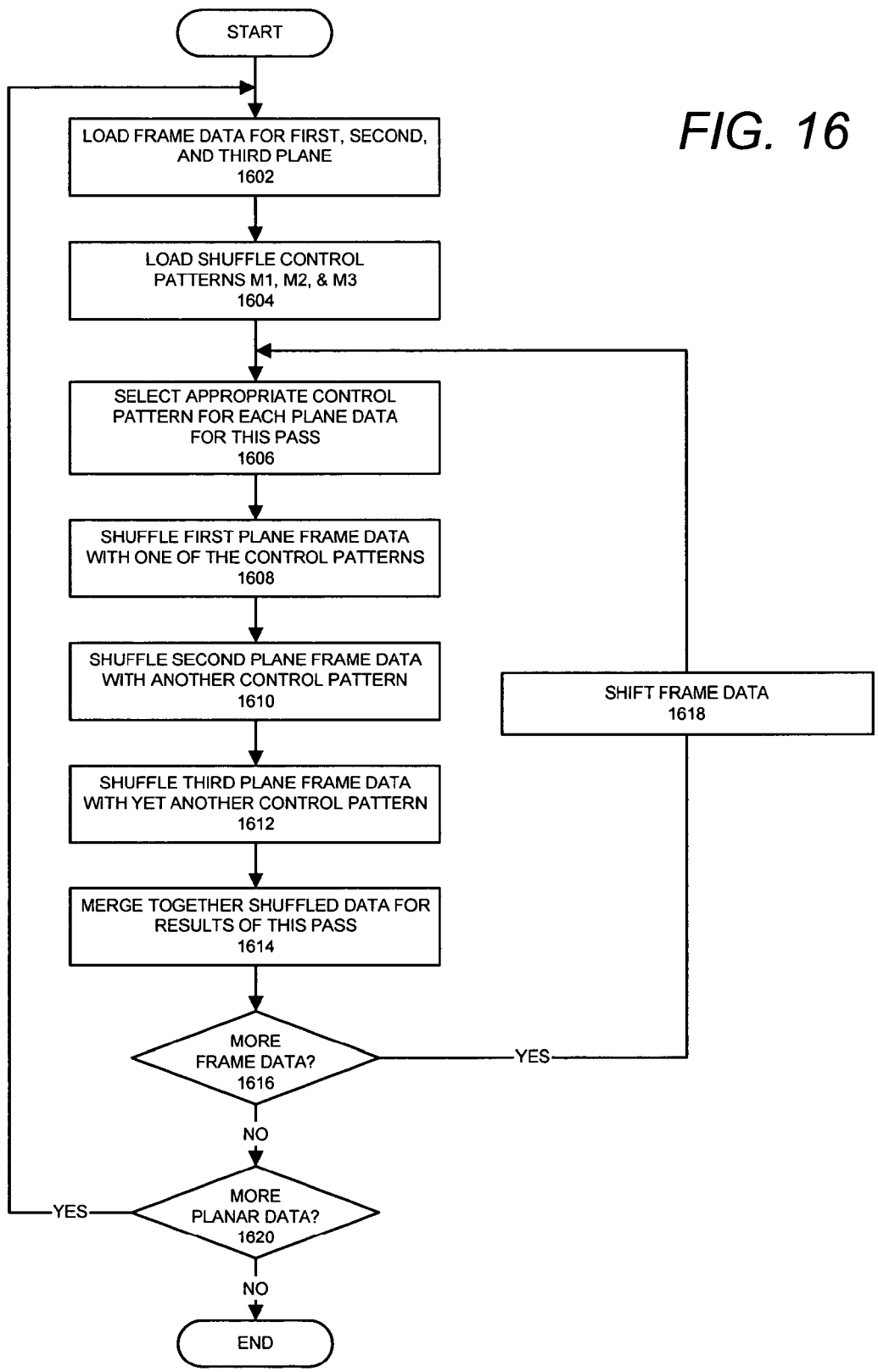
FIG. 16 is a flow chart illustrating one embodiment of a method to shuffle data between multiple registers to generate interleaved data.

FIG. 16 is a flow chart illustrating one embodiment of a method to shuffle data between multiple registers to generate interleaved data. For example, embodiments of the present method can be applied to the generation of interleaved pixel data as discussed in FIG. 15A-K. Although the present embodiment is described in the context of three data sources or planes of data, other embodiments can operate with two or more planes of data. These planes of data can include color data for one or more image frames. At block 1602, frame data for a first, second, and third plane are loaded. In this example, RGB color data for a plurality of pixels are available as individual colors from three different planes. The data in the first plane is for the color red, the data in the second plane is for green, and the data in the third plane is for blue. At block 1604, a set of masks with shuffle control patterns (M1, M2, and M3) are loaded. These shuffle control patterns determine the shuffle patterns and arrangement of data in order to interleave the colors together. Depending on the implementation, any number of shuffle patterns can be employed in order to generate the desired data arrangement.

At block 1606, an appropriate control pattern is selected for each plane of data. In this embodiment, the shuffle pattern is selected based on which order the color data is desired and which iteration is presently being executed. The frame data from the first data set, red, is shuffled with a first shuffle control pattern at block 1608 to obtain shuffled red data. The second data set, green, is shuffled at block 1610 with a second shuffle control pattern to obtain shuffled green data. At block 1612, the third data set, blue, is shuffled with a third shuffle control pattern to achieve shuffled blue data. Although the three masks and their shuffle control patterns are different from each other in this embodiment, a mask and its shuffle pattern can be used on more than a single data set during each iteration. Furthermore, some masks may be used more often than others.

At block 1614, the shuffled data of blocks 1608, 1610, 1612, for the three data sets are merged together to form the interleaved resultant for this pass. For example, the resultant of the first pass can look like the interleaved data 1532 of FIG. 15G, wherein the RGB data for each pixel is grouped together as a set. At block 1616, a check is made to determine whether there is more frame data loaded in the registers to shuffling. If not, a check is made at block 1620 to determine whether there is more data from the three planes of data to be interleaved. If not, the method is done. If there is more plane data available at block 1620, the process proceeds back to block 1602 to load more frame data for shuffling.

If the determination at block 1616 is true, the frame data in each plane of color data is shifted by a predetermined count that corresponds to whichever mask pattern was applied to the data set for that particular color during the last pass. For example, in keeping with the first pass example from FIG. 15G, the red, green, and blue data in the first, second, and third planes are shifted six, five, and five positions, respectively. Depending on the implementation, the shuffle pattern selected for each color data may be different each pass or the same one reused. During the second pass for one embodiment, the three masks from the first iteration are rotated such that first plane data is now paired with the third mask, second plane data is paired with the first mask, and third plane data is paired with the third mask. This mask rotation allows for the proper continuity of interleaved RGB data from one pass to the next, as illustrated in FIG. 15G and 15I. The shuffling and merging continues as in the first pass. Should a third or more iterations be desired, the shuffle mask patterns of this embodiment continue to be rotated among the different planes of data in order to generate more interleaved RGB data.

Embodiments of algorithms using packed shuffle instructions in accordance with the present invention can also improve processor and system performance with present hardware resources. But as technology continues to improve, embodiments of the present invention when combined with greater amounts of hardware resources and faster, more efficient logic circuits, can have an even more profound impact on improving performance. Thus, one efficient embodiment of a packed shuffle instruction having byte granularity and a flush to zero option can have different and greater impact across processor generations. Simply adding more resources in modern processor architectures alone does not guarantee better performance improvement. By also maintaining the efficiency of applications like one embodiment of the parallel table lookup and the packed byte shuffle instruction (PSHUFB), larger performance improvements can be possible.

Although the examples above are generally described in the context of 128 bits wide hardware/registers/operands to simplify the discussion, other embodiments employ 64 or 128 bits wide hardware/registers/operands to perform packed shuffle operations, parallel table lookups, and multiple register data rearrangement. Furthermore, embodiments of the present invention are not limited to specific hardware or technology types such as MMX/SSE/SSE2 technologies, and can be used with other SIMD implementations and other graphical data manipulating technologies.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A processor unit for shuffling data, comprising:
a register file including a plurality of registers to store data;
an instruction fetch unit to fetch an instruction;
an instruction decode unit to decode the instruction;
an execution unit operative to execute the instruction, receive from the register file a set of source data elements and a set of L control elements, wherein each of said L control elements is associated with a data element position in a resultant and indicates a position of one of said source data elements within a particular vector within said register file;
said execution unit also operative to shuffle a data element of the set of source data elements designated by an individual control element to said associated resultant data element position and where the execution unit supports the following values of L:
a first value;

second value that is half the first value;
a third value that is half the second value;
a fourth value that is half the third value;
wherein said execution unit includes more than one multiplexing level through which said data elements will flow, a first multiplexing layer to select data elements from only a portion of a particular vector having said data element, a second multiplexing layer to select data elements from another portion of said particular vector.

2. The processor unit of claim 1, wherein said processor unit comprises a single-instruction-multiple-data (SIMD) processor unit to perform SIMD operations.

3. The processor unit of claim 2, wherein said register file is coupled with said SIMD processor unit and includes a plurality of registers, each to store 128 bits of data.

4. The processor unit of claim 2, wherein said SIMD processor unit is integrated in a computer system and said computer system is configured to cause said SIMD processor unit to receive data in a digital stream to generate digital audio samples representative of voice communications.

5. The processor unit of claim 2, wherein said computer system is configured to cause said SIMD processor unit to receive data in a digital stream to generate digital motion video frames.

6. A data processing system comprising:
a single-instruction multiple data (SIMD) processor unit, said SIMD processor unit having:
a vector register file including a plurality of vector registers;
an instruction fetch unit to fetch an instruction;
an instruction decode unit to decode the instruction;
an execution unit operative to execute the instruction, receive from the vector register file a set of X-bit source data elements and a set of L control elements, wherein each of said L control elements is associated with an X-bit data element position in a resultant and indicates a position of one of said X-bit source data elements within a particular vector within said register file;
said execution unit is also operative to shuffle data from a data element of the set of X-bit source data elements designated by an individual control element to said associated resultant X-bit data element position;
said execution unit also operative to execute a second instruction, receive from the register file a set of 2x-bit source data elements and a set of L/2 control elements, wherein each of said L/2 control elements is associated with a 2x-bit data element position in a second resultant and indicates a position of one of said 2x-bit source data elements within a particular vector within said register file as well as indicates said particular vector, wherein the instruction format of the second instruction permits both one or more than one particular vector to be identified in the set of L/2 control elements;
said execution unit is also operative to shuffle data from a data element of the set of 2x-bit source data elements designated by an individual control element to said associated resultant 2x-bit data element position,
said execution unit also operative to execute a third instruction; receive from the register file a set of 4x-bit source data elements and a set of L/4 control elements, wherein each of said L/4 control elements is associated with a 4x-bit data element position in a second resultant and indicates a position of one of said 4x-bit source data elements within a particular vector within said register file as well as indicates said particular vector, wherein the instruction format of the third instruction permits both one or more than one particular vector to be identified in the set of L/4 control elements;
said execution unit is also operative to shuffle data from a data element of the set of 4x-bit source data elements designated by an individual control element to said associated resultant 4x-bit data element position;
said execution unit also operative to execute a fourth instruction, receive from the register file a set of 8x-bit source data elements and a set of L/8 control elements, wherein each of said L/8 control elements is associated with a 8x-bit data element position in a second resultant and indicates a position of one of said 8x-bit source data elements within a particular vector within said register file as well as indicates said particular vector, wherein the instruction format of the fourth instruction permits both one or more than one particular vector to be identified in the set of L/8 control elements;
said execution unit is also operative to shuffle data from a data element of the set of 8x-bit source data elements designated by an individual control element to said associated resultant 8x-bit data element position;
wherein said execution unit includes more than one multiplexing level through which any data element of said data elements will flow, a first multiplexing layer to select data elements from only a portion of a particular vector having said any data element, a second multiplexing layer to select data elements from another portion of said particular vector of said any data element.

7. The data processing system of claim 6, wherein said data processing system is configured to cause said SIMD processor unit to receive data in a digital stream to generate digital audio samples representative of voice communications.

8. The data processing system of claim 6, wherein said data processing system is configured to cause said SIMD processor unit to receive data in a digital stream to generate digital motion video frames.

9. The data processing system of claim 6 further comprising: a cache memory; and an input/output (I/O) system.

10. The data processing system of claim 6, wherein a main processor and said SIMD processor unit are integrated into a single processing core.

* * * * *